(12) United States Patent
Warshaw

(10) Patent No.: US 12,680,309 B2
(45) Date of Patent: Jul. 14, 2026

(54) MULTI-PIECED HANDRAIL-MOUNTING BRACKET AND CORRESPONDING METHOD

(71) Applicant: 9220-6820 Québec Inc., Dorval (CA)

(72) Inventor: William Kell Warshaw, Montréal (CA)

(73) Assignee: 9220-6820 Québec Inc., Dorval (CA)

( * ) Notice: Subject to any disclaimer, the term of this patent is extended or adjusted under 35 U.S.C. 154(b) by 325 days.

(21) Appl. No.: 17/792,849

(22) PCT Filed: Jan. 18, 2021

(86) PCT No.: PCT/CA2021/050047

§ 371 (c)(1),
(2) Date: Jul. 14, 2022

(87) PCT Pub. No.: WO2021/142551

PCT Pub. Date: Jul. 22, 2021

(65) Prior Publication Data

US 2023/0044982 A1     Feb. 9, 2023

Related U.S. Application Data

(60) Provisional application No. 62/962,586, filed on Jan. 17, 2020.

(51) Int. Cl.
*E04F 11/18* (2006.01)
*F16B 7/04* (2006.01)
*F16B 9/00* (2006.01)

(52) U.S. Cl.
CPC ........ *E04F 11/1836* (2013.01); *F16B 7/0473* (2013.01); *F16B 9/05* (2018.08)

(58) Field of Classification Search
CPC ........... E04F 11/1817; E04F 2011/1819; E04F 2011/1821; E04F 2011/1827;

(Continued)

(56) References Cited

U.S. PATENT DOCUMENTS 1,837,354 A * 12/1931 Boller ................. E04F 11/1817
403/125
2,924,468 A * 2/1960 Pinson ................ E04H 17/1413
403/353

(Continued)

FOREIGN PATENT DOCUMENTS

FR        773310 A * 11/1934 ............ F16B 7/0446
FR      2581717 A1 * 11/1986 ............ F16B 7/0486
GB      982681 A      2/1965

OTHER PUBLICATIONS

International Search Report issued in corresponding International (PCT) Patent Application No. PCT/CA2021/050047 (Mar. 9, 2021).

(Continued)

*Primary Examiner* — Amber R Anderson
*Assistant Examiner* — Zachary A Hall
(74) *Attorney, Agent, or Firm* — Reising Ehtington P.C.

(57) ABSTRACT

The present disclosure concerns a handrail-mounting bracket assembly for mounting a first handrail element to a second handrail element or a support structure, the bracket assembly comprising: a first handrail-mounting subassembly including a first handrail-mounting member and a first connecting member; a second handrail-mounting subassembly including a second handrail-mounting member and a second connecting member; the bracket assembly being selectively configurable in an engagement configuration in which the first and second handrail-mounting members are at least partially insertable into a bracket-engaging opening of the first handrail element, and in a mounting configuration wherein the first and second handrail-mounting members at least partially form together a handrail-mounting end portion and are locked with the first handrail element so as to prevent removal of the bracket assembly from the bracket-engaging opening once inserted therein. It also concerns a (Continued)

corresponding method for removably mounting a multi-pieced handrail-mounting bracket to a handrail element.

18 Claims, 22 Drawing Sheets

(58) Field of Classification Search
CPC ............ E04H 17/1413; E04H 17/1417; E04H 17/1488; F16B 7/044; F16B 7/0446; F16B 7/0473
See application file for complete search history.

(56) References Cited

U.S. PATENT DOCUMENTS

| | | | |
|---|---|---|---|
| 3,157,378 A | 11/1964 | Blum | |
| 3,574,367 A * | 4/1971 | Jankowski | B62D 33/044 |
| | | | 403/201 |
| 3,804,374 A * | 4/1974 | Thom | E04F 11/181 |
| | | | 256/65.01 |
| 4,108,422 A | 8/1978 | Fleischmann | |
| 4,650,164 A | 3/1987 | Shepherd | |
| 5,421,666 A * | 6/1995 | Spears | F16B 7/0446 |
| | | | 52/81.3 |
| 2015/0252569 A1 | 9/2015 | Warshaw | |

OTHER PUBLICATIONS

Written Opinion issued in corresponding International (PCT) Patent Application No. PCT/CA2021/050047 (Mar. 9, 2021).
Supplementary Search Report issued in corresponding European Patent Application No. 21741065.3 (Jan. 26, 2024).

* cited by examiner

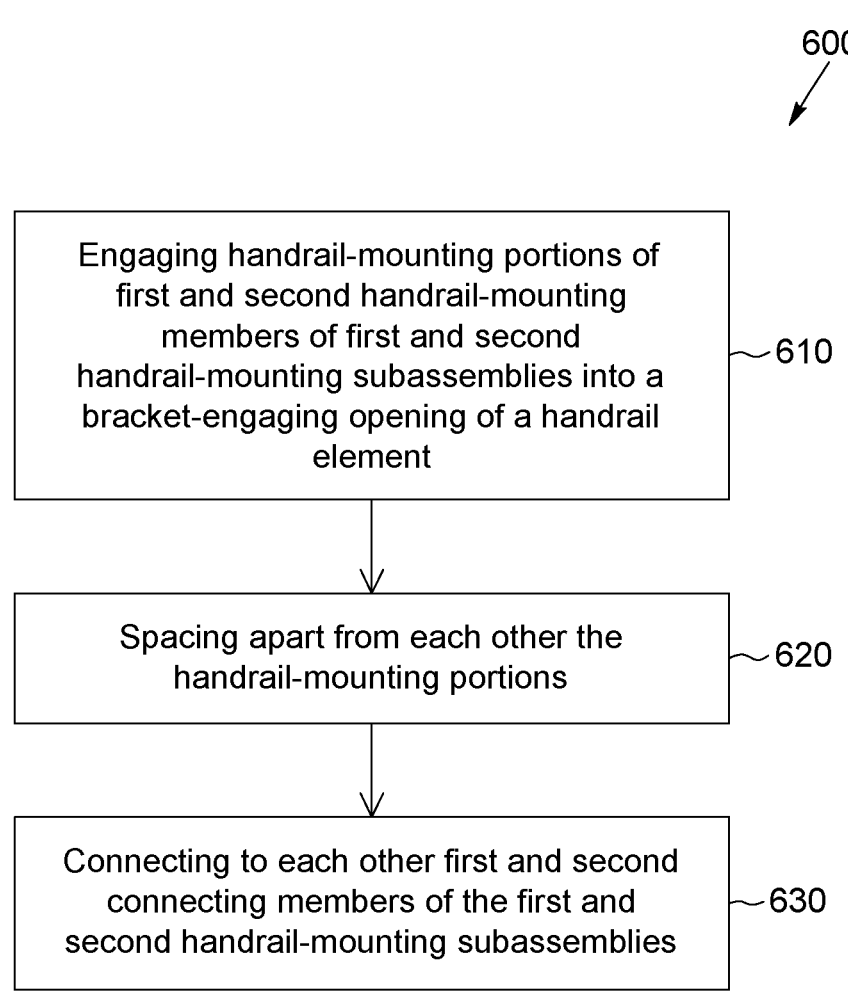

600

Engaging handrail-mounting portions of first and second handrail-mounting members of first and second handrail-mounting subassemblies into a bracket-engaging opening of a handrail element ~610

Spacing apart from each other the handrail-mounting portions ~620

Connecting to each other first and second connecting members of the first and second handrail-mounting subassemblies ~630

FIG. 20

MULTI-PIECED HANDRAIL-MOUNTING BRACKET AND CORRESPONDING METHOD

PRIOR APPLICATION

The present application claims priority from U.S. provisional patent application No. 62/962,586, filed on Jan. 17, 2020, and entitled "HANDRAIL-MOUNTING BRACKET ASSEMBLY", the disclosure of which being hereby incorporated by reference in its entirety.

TECHNICAL FIELD

The technical field relates to handrails, and more particularly to brackets for mounting a handrail assembly to a support structure or to connect together handrail components of a handrail assembly and to corresponding methods.

BACKGROUND

Continuous railings and/or handrails that transition from sloping to horizontal and/or that follow angle changes between walls are desirable for appearance, safety and/or regulatory compliance. Moreover, continuous railings or handrails are helpful for seniors or people with walking difficulties.

Such handrail assemblies usually comprise handrail sections that can be of different shapes, types and/or dimensions and thus require specific mounting assemblies to safely mount the different handrail sections to a support structure such as a wall and/or to connect together adjacent handrail sections.

SUMMARY

According to a first general aspect, there is provided a handrail-mounting bracket assembly for mounting a first handrail element to a second handrail element or a support structure, the bracket assembly comprising: a first handrail-mounting subassembly including a first handrail-mounting member and a first connecting member; a second handrail-mounting subassembly including a second handrail-mounting member and a second connecting member; the bracket assembly being selectively configurable in an engagement configuration in which the first and second handrail-mounting members are at least partially insertable into a bracket-engaging opening of the first handrail element, and in a mounting configuration wherein the first and second handrail-mounting members at least partially form together a handrail-mounting end portion of the bracket assembly and are locked with the first handrail element so as to prevent removal of the bracket assembly from the bracket-engaging opening once inserted therein.

According to another general aspect, there is provided a multi-pieced handrail-mounting bracket for mounting a first handrail element to a second handrail element or a support structure, the multi-pieced handrail-mounting bracket having a handrail-mounting end portion and comprising first and second handrail-mounting subassemblies comprising respectively: first and second handrail-mounting members at least partially removably engageable in a bracket-engaging opening formed in the first handrail element and forming at least partially the handrail-mounting end portion; and first and second connecting members; wherein the multi-pieced handrail-mounting bracket is configurable into an engagement configuration in which the handrail-mounting end portion has a first cross-section smaller than an opening dimension of the bracket-engaging opening, and into a mounting configuration wherein the first and second handrail-mounting members are connected to each other and the handrail-mounting end portion has a second cross-section greater than the opening dimension of the bracket-engaging opening.

According to another general aspect, there is provided a method for removably mounting a multi-pieced handrail-mounting bracket to a handrail element having a bracket-engaging opening, the multi-pieced handrail-mounting bracket comprising first and second handrail-mounting subassemblies having respectively first and second handrail-mounting members and first and second connecting members, the method comprising: engaging handrail-mounting portions of the first and second handrail-mounting members into the bracket-engaging opening; spacing apart from each other the handrail-mounting portions; and connecting to each other the first and second connecting members of the first and second handrail-mounting subassemblies.

According to another aspect, there is provided a handrail-mounting bracket assembly for mounting a first handrail element to a second handrail element, the bracket assembly comprising: a first handrail-mounting member including a first handrail-mounting portion and a first connecting portion; a second handrail-mounting member including a second handrail-mounting portion and a second connecting portion, the first and second handrail-mounting members being selectively configurable in an engagement configuration in which the first and second handrail-mounting portions are insertable into a bracket-engaging opening of the first handrail element, and in a mounting configuration wherein the first and second handrail-mounting portions are lockable within the bracket-engaging opening so as to prevent removal of the bracket assembly from the bracket-engaging opening once inserted therein.

In at least some embodiments, the first and second handrail-mounting members are configured such that in the mounting configuration, the first and second connecting portions form a connecting portion securable to the second handrail element.

According to another aspect, there is provided a two-piece handrail-mounting bracket having a handrail-mounting end portion and comprising first and second handrail-mounting members comprising respectively: first and second handrail-mounting portions removably engageable in a bracket-engaging opening formed in a first handrail element and forming at least partially the handrail-mounting end portion; and first and second connecting portions; wherein the two-piece handrail-mounting bracket is configurable into an engagement configuration in which the handrail-mounting end portion has a first cross-section smaller than an opening dimension of the bracket-engaging opening, and into a mounting configuration wherein the first and second connecting portions are connected to each other and the handrail-mounting end portion has a second cross-section greater than the opening dimension of the bracket-engaging opening.

According to yet another aspect, there is also provided a method for removably mounting a two-piece handrail-mounting bracket to a handrail element having a bracket-engaging opening, the method comprising: pivoting toward each other first and second handrail-mounting portions of first and second handrail-mounting members of the two-piece handrail-mounting bracket; engaging the first and second handrail-mounting portions in the bracket-engaging opening; pivoting toward each other first and second connecting portions of the first and second handrail-mounting members; and connecting to each other the first and second handrail-mounting members.

BRIEF DESCRIPTION OF THE DRAWINGS

FIG. 20 is a block diagram schematically representing the different steps of a method for removably mounting a multi-pieced handrail-mounting bracket to a handrail element having a bracket-engaging opening.

DETAILED DESCRIPTION

Figure 1:
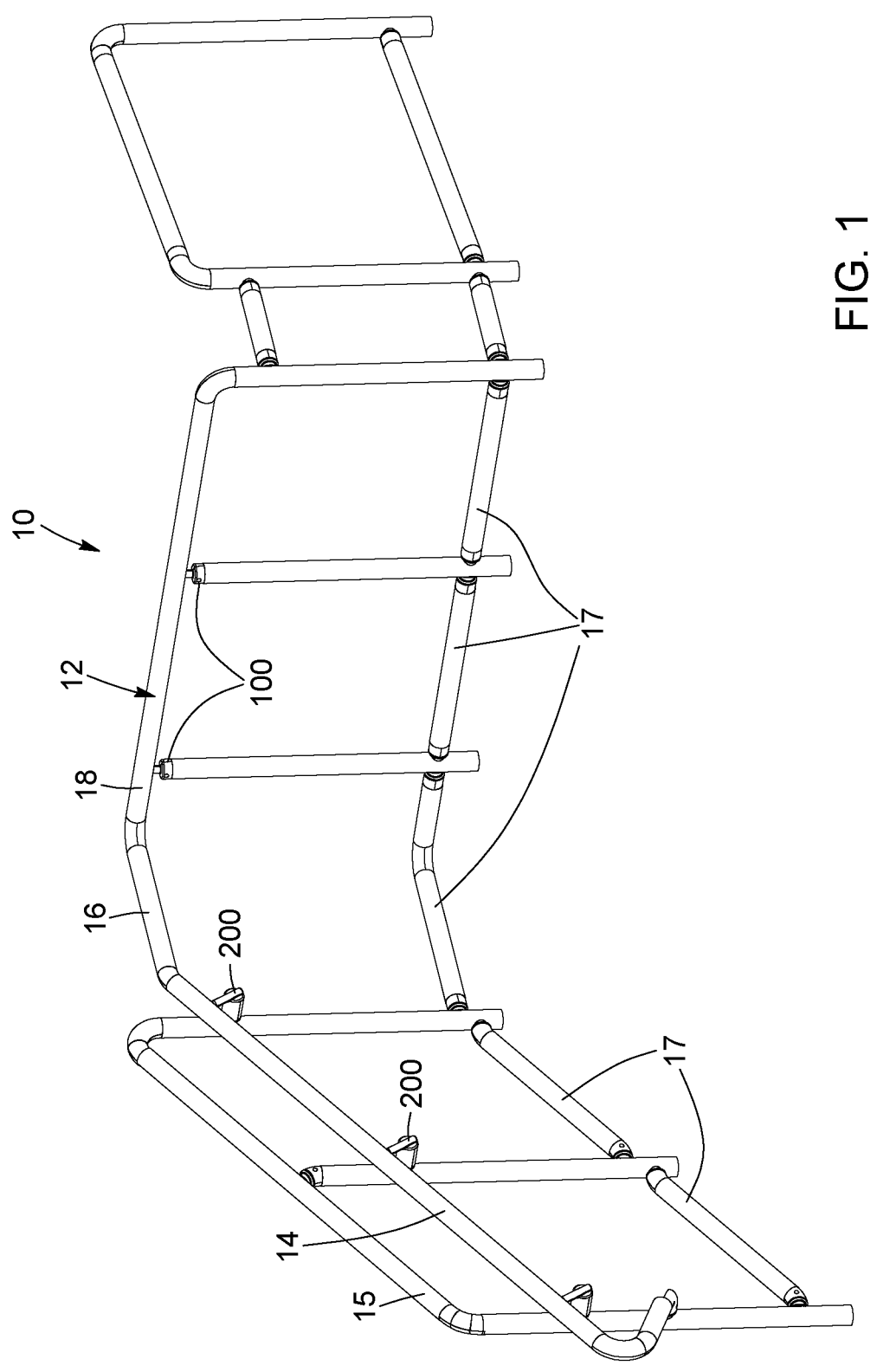
FIG. 1 is a perspective view of a handrail assembly comprising a plurality of handrail elements connected to each other by a plurality of handrail-mounting bracket assemblies in accordance with several embodiments of the present disclosure.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional and are given for exemplification purposes only.

Moreover, it will be appreciated that positional descriptions such as "above", "below", "forward", "rearward", "left", "right" and the like should, unless otherwise indicated, be taken in the context of the figures only and should not be considered limiting. Moreover, the figures are meant to be illustrative of certain characteristics of the different components of the handrail assembly and are not necessarily to scale.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the following description, an embodiment is an example or implementation. The various appearances of "one embodiment", "an embodiment" or "some embodiments" do not necessarily all refer to the same embodiments. Although various features may be described in the context of a single embodiment, the features may also be provided separately or in any suitable combination. Conversely, although the invention may be described herein in the context of separate embodiments for clarity, it may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments.

Furthermore, it is to be understood that the disclosure can be carried out or practiced in various ways and that the disclosure can be implemented in embodiments other than the ones outlined in the description above. It is to be understood that the terms "including", "comprising", and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. It will be appreciated that the methods described herein may be performed in the described order, or in any suitable order.

Handrail Assembly

Referring now to the drawings, and more particularly to FIG. 1, there is shown a rail assembly 10 (or handrail assembly 10) comprising a plurality of safety guardrail sections and handrail sections. In the embodiment shown, the rail assembly 10 is of the free-standing type but it could also be conceived a handrail assembly that would be configured to be secured to a wall, such as an angled wall. The rail assembly 10 might be shaped and dimensioned so as to substantially follow the shape of a wall. In the following description, even though the different bracket assemblies are usually referred to as handrail-mounting bracket assemblies, it should be understood that the bracket assemblies can be shaped and dimensioned to connect together handrail and/or safety guardrail elements and/or to secure handrail and/or safety guardrail elements to a support structure and/or to a ground surface. Moreover, it is understood that the rail assembly 10 (or handrail assembly 10) can comprise safety guardrails and/or handrails in any configuration and can be built with extruded rail elements, substantially tubular rail elements, bended portions, or any combination thereof.

In the embodiment shown in FIG. 1, and without being limitative, the rail assembly 10 (or handrail assembly 10) comprises a substantially horizontal handrail section 12 comprising for instance two handrail portions 16, 18 angled relative to each other, for instance to substantially follow the shape of a wall (not represented). The handrail assembly 10 further comprises an inclined handrail section 14, for instance shaped and dimensioned to substantially follow an inclination of stairs (not represented). In the embodiment shown, the inclined handrail section 14 is secured to a free-standing guardrail 15. The handrail assembly 10 also comprises a plurality of toe-guards 17 spaced apart from and substantially parallel to the inclined and horizontal handrail sections 14, 12.

As described in detail below, the handrail assembly 10 comprises a plurality of handrail elements connected to each other by a plurality of handrail element connectors and by a plurality of handrail-mounting bracket assemblies in accordance with several embodiments of the present disclosure. As detailed below, the handrail elements might comprise, for instance, extruded handrail elements, substantially tubular elements, handrail caps, or the like. The handrail elements might also be substantially longitudinal or curved or of any other shape. The handrail assembly 10 might be of the free-standing type and/or mounted, either directly or indirectly, to a support structure, such as, for instance, a wall and/or a ground surface.

In the embodiment shown, and as detailed below, the handrail assembly might comprise a plurality of T-shaped handrail-mounting bracket assemblies 100 (or T-shaped multi-pieced—for instance two-pieced—handrail-mounting brackets 100) and a plurality of L-shaped handrail-mounting bracket assemblies 200, 400, 500 (or L-shaped multi-pieced—for instance two-pieced or three-pieced—handrail-mounting brackets 200, 400, 500).

As detailed below, the handrail-mounting bracket assemblies might be of different types so as to connect together different handrail elements of any type of handrail assembly, possibly of different types, shapes and/or dimensions and/or to connect handrail elements to a support structure and/or to a ground surface.

As detailed below, the handrail-mounting bracket assemblies 100, 200, 400, 500 (for instance two-pieced or three-pieced handrail-mounting brackets) comprise first and second handrail-mounting subassemblies which are displaceable with respect to each other to facilitate engagement of the handrail-mounting bracket assembly with the corresponding handrail element and which are also securable together once engaged in the handrail element to prevent disengagement of the handrail element from the handrail-mounting bracket assembly and to allow connection of the handrail-mounting bracket assembly to a second handrail element.

Specifically, the handrail-mounting bracket assemblies 100, 200, 400, 500 are configurable into at least an engagement configuration in which handrail-mounting portions of the first and second handrail-mounting subassemblies are removably insertable into a bracket-engaging opening formed in a first handrail element, and into a mounting configuration—or locked configuration—wherein the first and second handrail-mounting subassemblies are connected to each other and the handrail-mounting portions of the first and second handrail-mounting subassemblies are locked within the bracket-engaging opening of the first handrail element.

In other words, as detailed below, the bracket assembly comprises a first handrail-mounting subassembly including a first handrail-mounting member and a first connecting member; a second handrail-mounting subassembly including a second handrail-mounting member and a second connecting member. The bracket assembly is selectively configurable in an engagement configuration in which the first and second handrail-mounting members are at least partially insertable into a bracket-engaging opening of the first handrail element, and in a mounting configuration wherein the first and second handrail-mounting members form together a handrail-mounting end portion of the handrail-mounting bracket assembly and are locked with the first handrail element so as to prevent removal of the bracket assembly from the bracket-engaging opening once inserted therein.

In yet other words, the multi-pieced handrail-mounting bracket has a handrail-mounting end portion and comprises first and second handrail-mounting subassemblies comprising respectively: first and second handrail-mounting members at least partially removably engageable in the bracket-engaging opening formed in the first handrail element and forming at least partially the handrail-mounting end portion; and first and second connecting members. The multi-pieced handrail-mounting bracket is configurable at least into an engagement configuration in which the handrail-mounting end portion has a first cross-section smaller than an opening dimension of the bracket-engaging opening, and into a mounting configuration wherein the first and second handrail-mounting members are connected to each other and the handrail-mounting end portion has a second cross-section greater than the opening dimension of the bracket-engaging opening.

Two-Pieced T-Shaped Handrail-Mounting Bracket

Handrail Element

FIGS. 2 to 6 represent a first possible embodiment of the handrail-mounting bracket assembly 100 (or two-pieced handrail-mounting bracket)—for instance substantially T-shaped—mountable to a handrail element 20 (to an extruded handrail element 20, in the embodiment shown).

Figure 2:
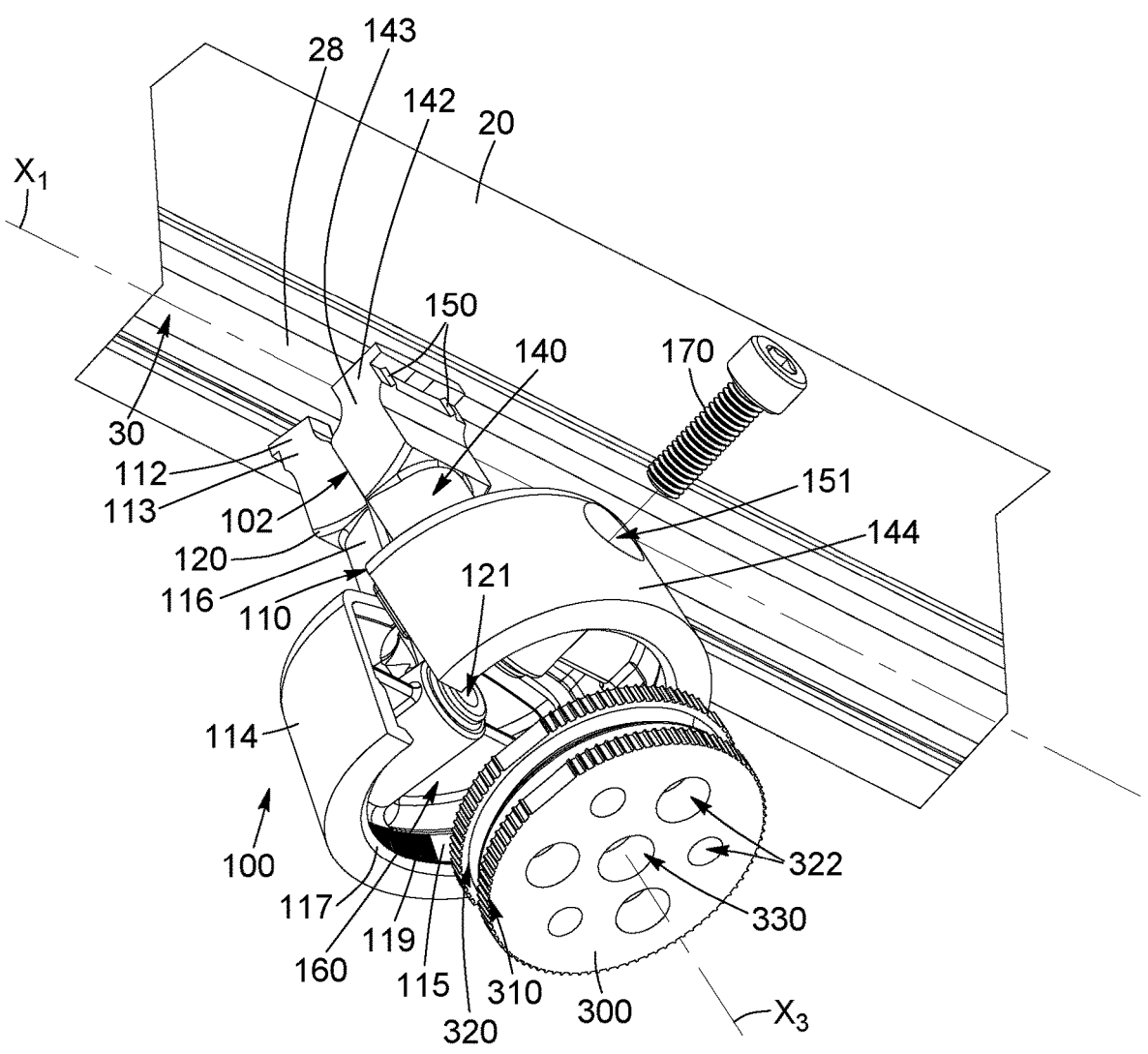
FIG. 2 is a bottom perspective view of a handrail element and a handrail-mounting bracket assembly in accordance with a first embodiment, the handrail-mounting bracket assembly being substantially T-shaped and comprising first and second handrail-mounting subassemblies, the bracket assembly being configured in an engagement configuration.
Figure 3:
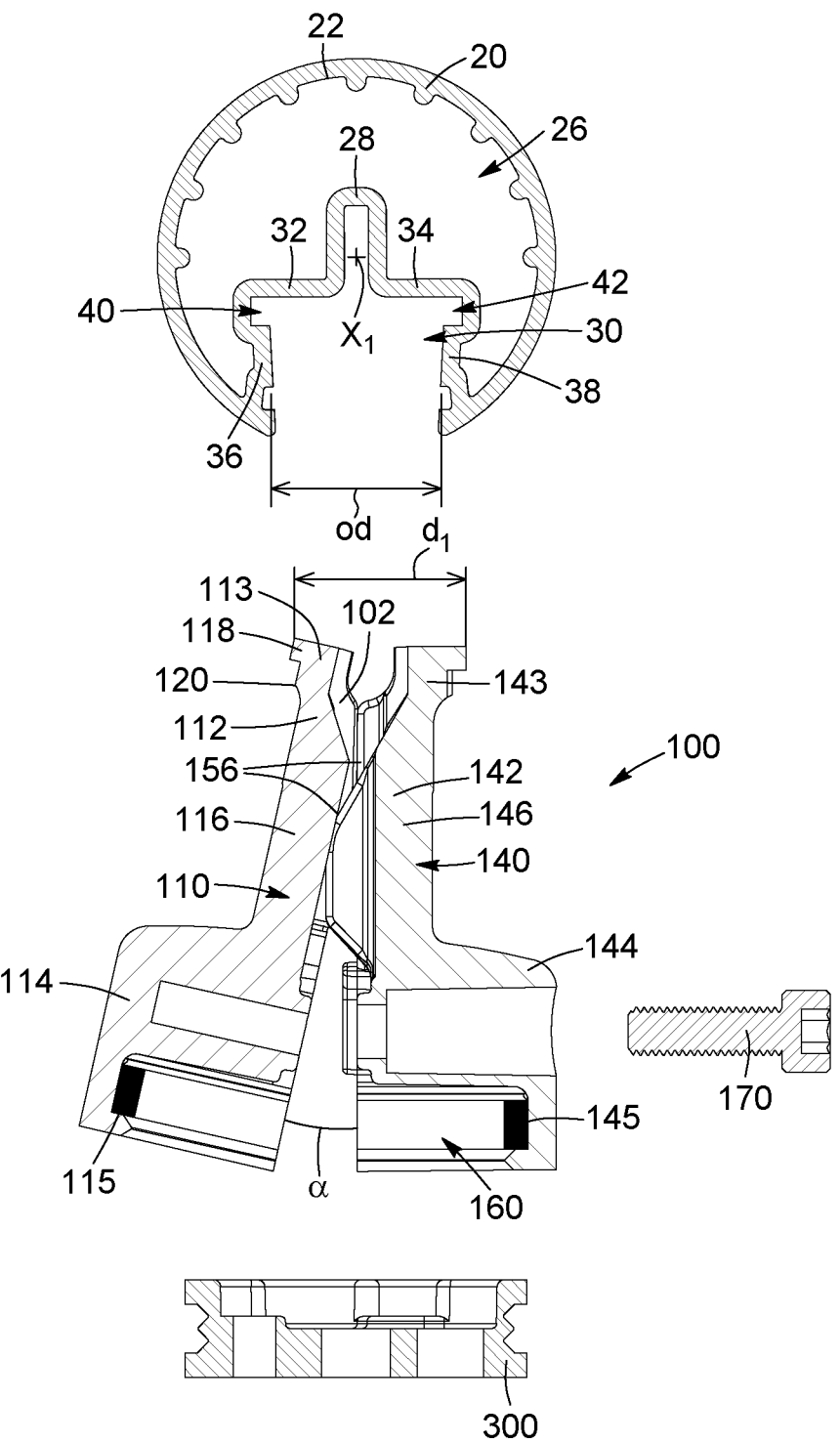
FIG. 3 is a cross-section view of the handrail element and the handrail-mounting bracket assembly of FIG. 2.
Figure 10:
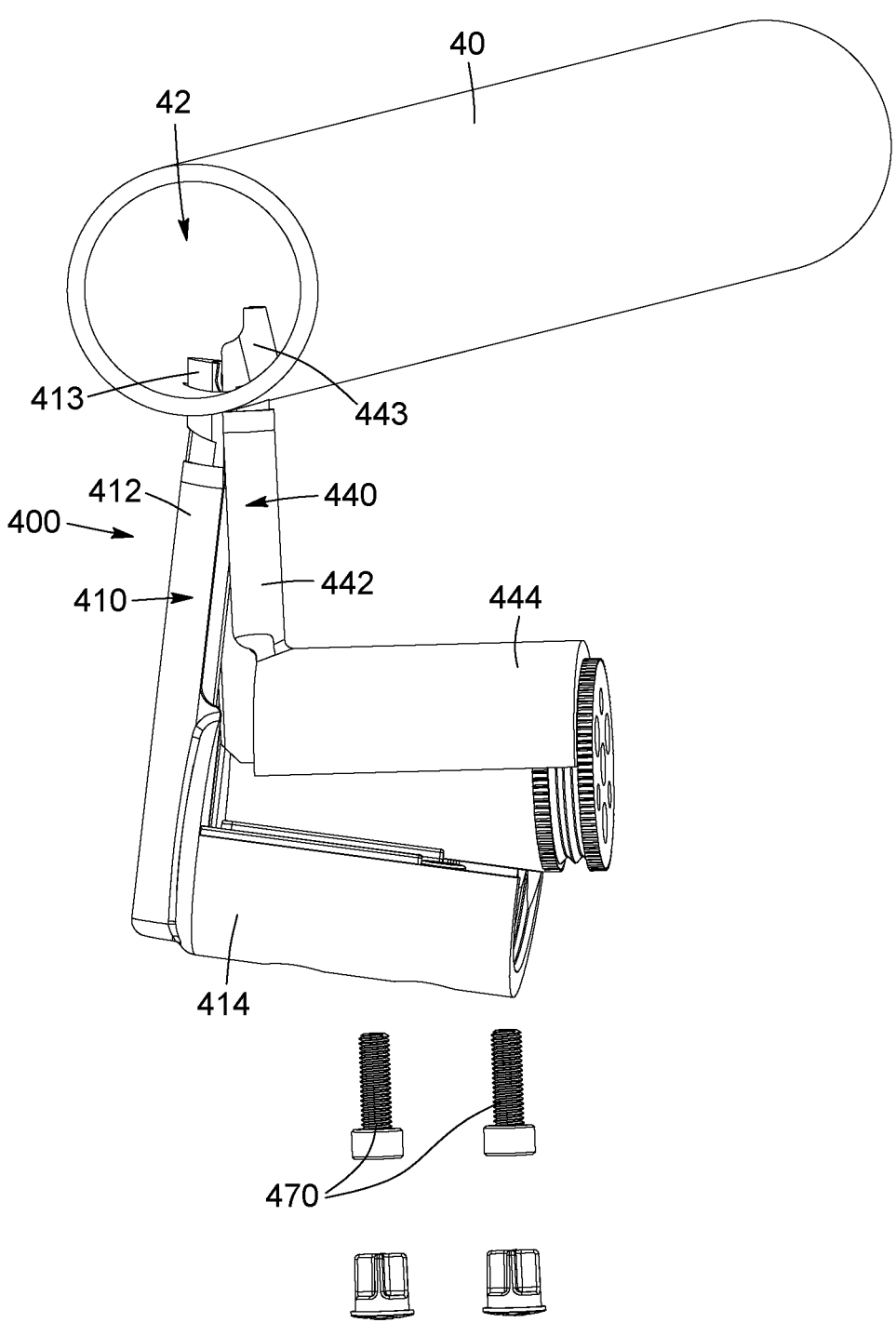
FIG. 10 is a side perspective view of a handrail element and a handrail-mounting bracket assembly in accordance with another embodiment, the handrail-mounting bracket assembly being configured in the engagement configuration.
Figure 11:
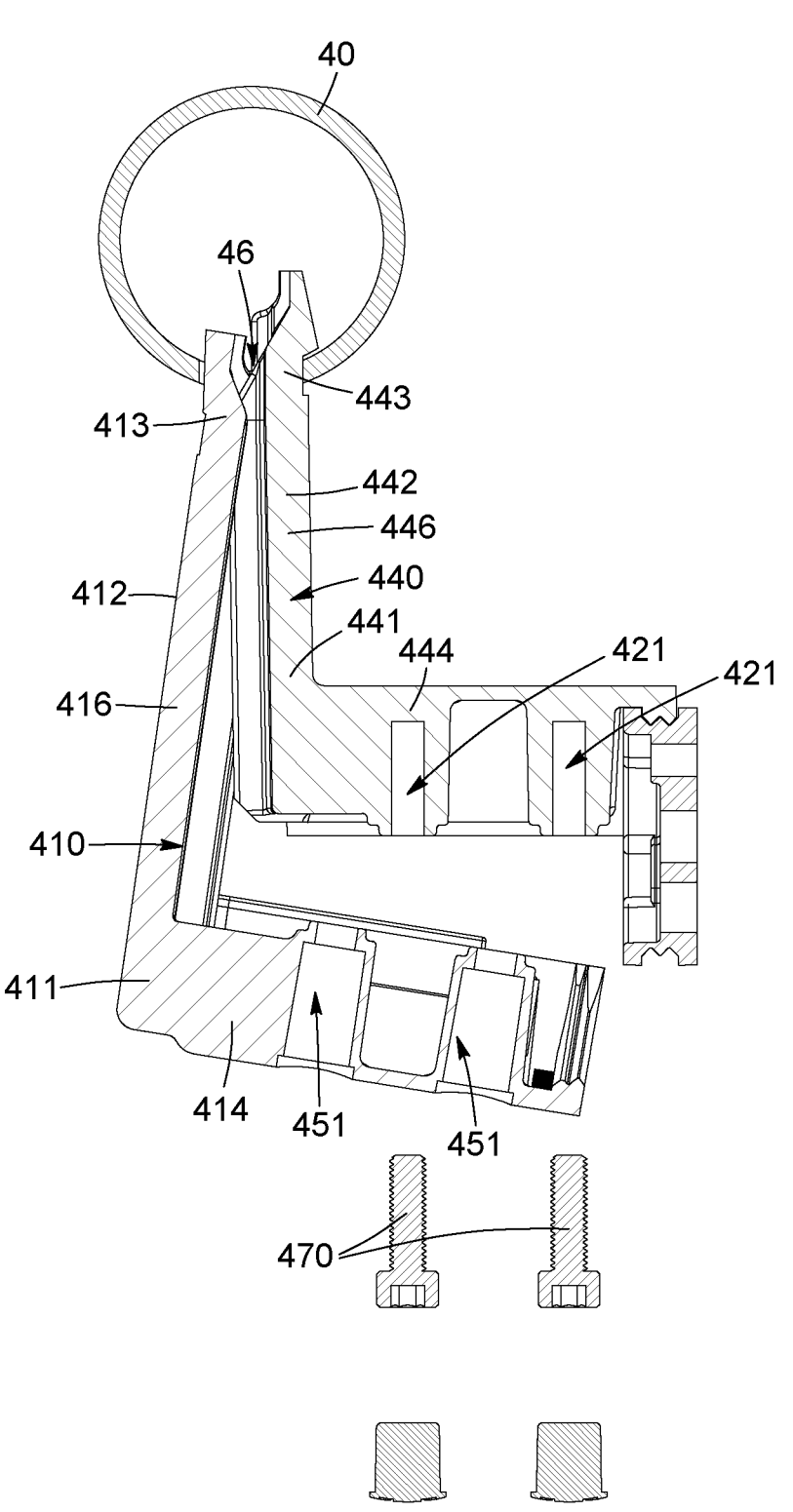
FIG. 11 is a cross-section view of the handrail element and the handrail-mounting bracket assembly of FIG. 10.
Figure 12:
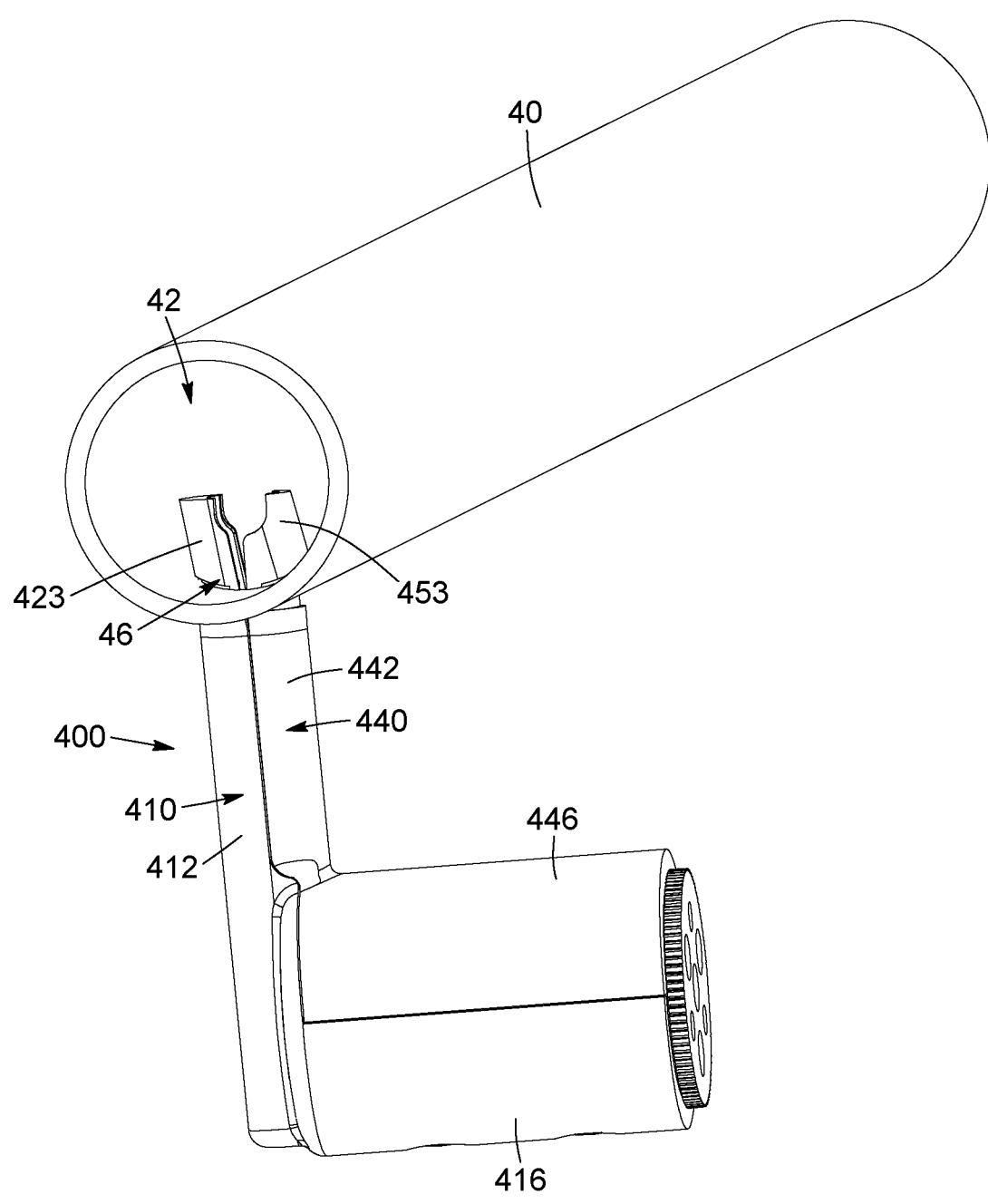
FIG. 12 is a side perspective view of the handrail element and the handrail-mounting bracket assembly of FIG. 10, the handrail-mounting bracket assembly being configured in the locked configuration.

As represented in FIGS. 2 to 4B, in the embodiment shown, the extruded handrail element 20 extends along a handrail axis X1. The extruded handrail element 20 has an inner surface 22 and defines an inner handrail cavity 26 at least partially delimited by the inner surface 22 and by a longitudinal extruded inner separation wall 28 at least partially delimiting a bracket-receiving channel 30 (or bracket-engaging opening 30 or bracket-engaging aperture 30). In the embodiment shown, the extruded handrail element 20 has a substantially cylindrical shape but it could also be conceived a handrail element of any other shape, as long as it comprises a bracket-engaging opening, for instance as represented in FIGS. 3 and 4A or as represented in the below-described embodiment of FIG. 10. In other words, as described below, the handrail-bracket assembly of the present invention could be used to be mounted to any handrail profile, solid or hollow.

Figure 4A:
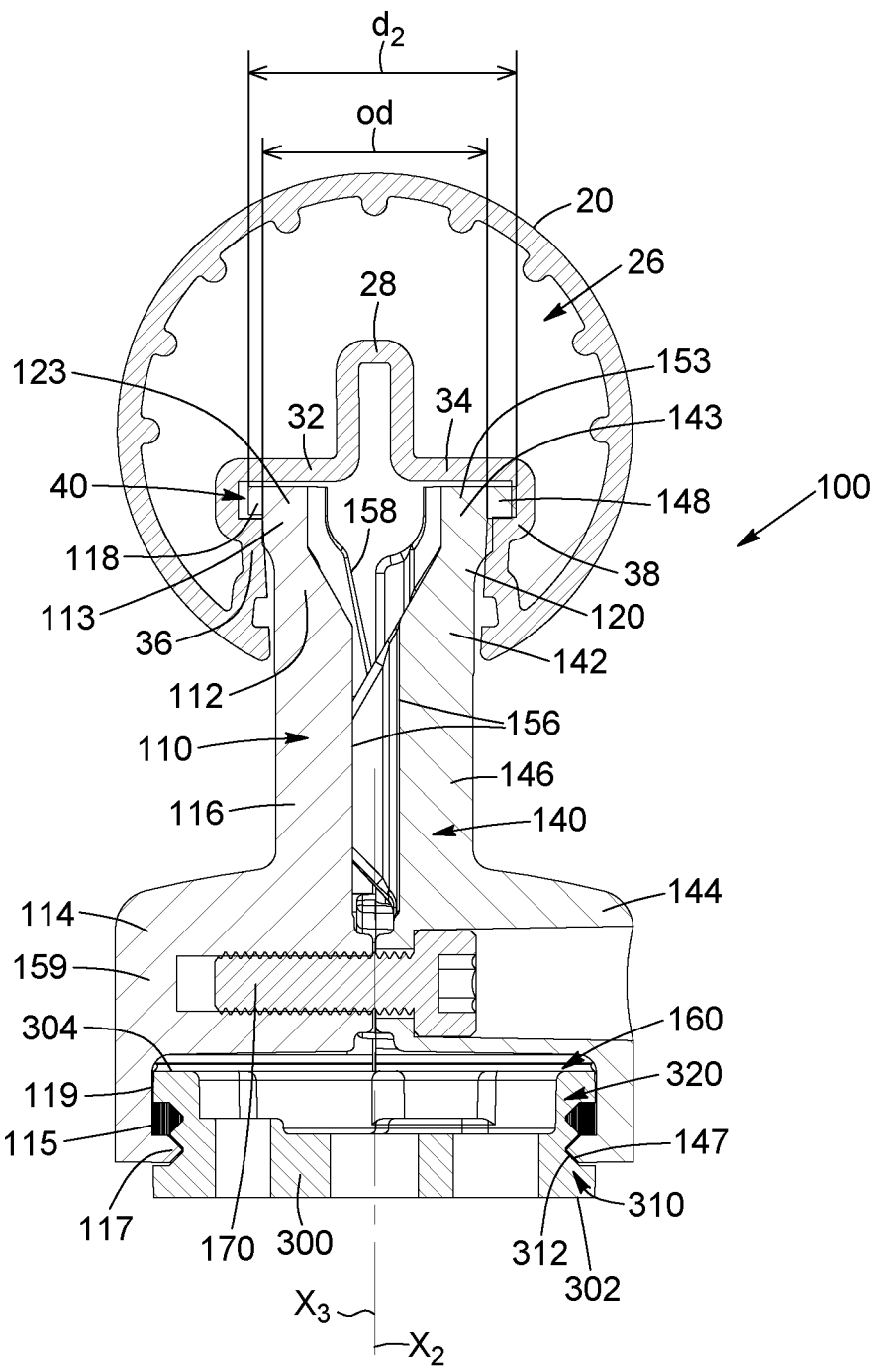
FIG. 4A is a cross-section view of the handrail element and the handrail-mounting bracket assembly of FIG. 2 in a first plane substantially perpendicular to a handrail axis of the handrail element, the handrail-mounting bracket assembly being configured in a mounting configuration or locked configuration in which the handrail-mounting bracket assembly and the handrail element are locked together.

In the embodiment shown, and as best represented in FIGS. 3 and 4A, the inner separation wall 28 comprises first and second bottom wall portions 32, 34 extending substantially parallel to the handrail axis X1. The inner separation wall 28 further comprises first and second lateral wall portions 36, 38 extending between the respective one of the first and second bottom wall portions 32, 34 and the inner surface 22 and substantially transversal (substantially perpendicular, in the embodiment shown) to the first and second bottom wall portions 32, 34. In the embodiment shown, first and second bracket-engaging slots 40, 42 are formed at a junction between a respective one of the first and second lateral wall portions 36, 38 and the corresponding one of the first and second bottom wall portions 32, 34, so that the bracket-receiving channel 30 is substantially T-shaped in the embodiment shown.

It is appreciated that the shape and the configuration of the extruded handrail element 20, in particular the shape, the configuration, the location and/or the number of the longitudinal protrusions 24, the longitudinal inner separation wall 28, the bracket-receiving channel 30 and the first and second bracket-engaging slots 40, 42 can vary from the embodiment shown.

Handrail-Mounting End Portion

In the embodiment shown in FIGS. 2 to 6, the T-shaped handrail-mounting bracket assembly 100 comprises a hand-rail-mounting end portion 102. The handrail-mounting bracket assembly 100—or multi-pieced—for instance two-pieced—handrail-mounting bracket 100—comprises first and second handrail-mounting subassemblies 110, 140 which are movable with respect to each other.

As detailed below, at least one of the first and second handrail-mounting subassemblies 110, 140 can be single-pieced or multi-pieced (for instance two-pieced). In the first embodiment shown, each of the first and second handrail-mounting subassemblies is integrally formed as a single component.

The first and second handrail-mounting subassemblies 110, 140 comprise respectively first and second handrail-mounting members 112, 142 and first and second connecting members 114, 144 (or first and second connector-covering hoods 114, 144).

As detailed below, each of the first and second handrail-mounting members 112, 142 has a handrail-mounting portion 113, 143 (or first and second proximal end portions 113, 143, considered with respect to the bracket-engaging opening 30 when the bracket assembly 100 is configured in the mounting configuration), an opposed hood-mounting portion 111, 141 formed integral with the corresponding one of the first and second connecting members 114, 144 and a bracket body 116, 146 therebetween.

The first and second handrail-mounting members 112, 142 comprise a handrail-engaging head 123, 153 forming at least partially the handrail-mounting portion 113, 143, the handrail-engaging head 123, 153 having a cross-section greater than a cross-section of the corresponding bracket body 116, 146. In the embodiment shown, the bracket body 116, 146 of at least one of the first and second handrail-mounting members 112, 142 is substantially semi-cylindrical.

In the embodiment shown, the handrail-engaging heads 123, 153 are engageable in the bracket-receiving channel 30 (or bracket-engaging opening 30) of the extruded handrail element 20. The handrail-engaging heads 123, 153 of the first and second handrail-mounting members 112, 142 form at least partially the handrail-mounting end portion 102 of the T-shaped handrail-mounting bracket assembly 100.

The first and second handrail-mounting subassemblies 110, 140 further comprise respectively the first and second connecting members 114, 144, the first and second bracket bodies 116, 146 (or first and second intermediate portions 116, 146 of the first and second handrail-mounting subassemblies 110, 140) extending respectively between the handrail-engaging heads 123, 153 of the first and second handrail-mounting members 112, 142 and the first and second connecting members 114, 144.

First and Second Handrail-Mounting Subassemblies

In the embodiment shown, the first and second handrail-mounting subassemblies 110, 140 have a substantially similar shape (unless specifically indicated), so that the following description of the first handrail-mounting subassembly 110 will apply to both of them.

In the first non-limitative embodiment shown, each of the first and second handrail-mounting subassemblies 110, 140 is substantially single-pieced.

The handrail-engaging head 123 of the first handrail-mounting member 112 comprises a locking end portion 118, an outer cross-section of the handrail-engaging head 123 increasing towards the locking end portion 118. In other words, the handrail-engaging head 123 is substantially diverging toward the locking end portion 118.

The first handrail-mounting member 112 comprises a substantially curved outer profile 120 at a junction of the handrail-engaging head 123 and the bracket body 116 (i.e. between the locking end portion 118 and the bracket body 116).

As represented in FIG. 2, the outer profile 120 is substantially curved and a cross-section of the handrail-mounting member 112 substantially increases towards the locking end portion 118. In the embodiment shown at least one of the handrail-engaging heads 123, 153 of the first and second handrail-mounting members 112, 142 comprise one or more engagement teeth 150 (best shown in FIG. 2) protruding outwardly from an outer surface thereof.

In the embodiment shown, the bracket body 116 (or intermediate portion 116) of the first handrail-mounting member 112 and the first connecting member 114 have a substantially semi-cylindrical shape substantially coaxial with each other. The first connecting member 114 is substantially greater in diameter than the first handrail-mounting member 112 (for instance the handrail-mounting portion and the intermediate portion 116 thereof).

In the embodiment shown, the connecting member 114 has an inner surface 115 and comprises a coupling lip 117 (or inner lip 117) protruding inwardly from the inner surface 115. The connecting member 114 further comprises coupling teeth 119 formed on the inner surface 115 along at least a portion of a peripheral wall of the connecting member 114.

As represented in FIGS. 2 and 3, the handrail-mounting bracket assembly 100 is configurable into an engagement configuration in which the first and second handrail-mounting members 112, 142 are at least partially insertable into the bracket-engaging opening 30 of the extruded handrail element 20. When the handrail-mounting bracket assembly 100 is configured in the engagement configuration, the handrail-mounting end portion 102 at least partially formed by the first and second handrail-mounting members 112, 142 (at least partially formed by the handrail-engaging heads 123, 153 thereof) has a first outer cross-section d1 smaller than an opening dimension od of the bracket-engaging opening 30. The first outer cross-section d1 and the opening dimension od are considered substantially transversally (for instance perpendicularly) to the handrail axis X1. It is thus understood that, when configured into the engagement configuration, at least a portion of the handrail-mounting bracket assembly 100 (at least a portion of the handrail-mounting end portion 102 thereof, i.e. at least a portion of the first and second handrail-mounting members 112, 142 in the embodiment shown) can be engaged into the bracket-receiving channel 30.

When the handrail-mounting bracket assembly 100 is configured in the engagement configuration, the first and second connecting members 114, 144 are spaced apart from each other (i.e. do not contact each other).

Figure 4B:
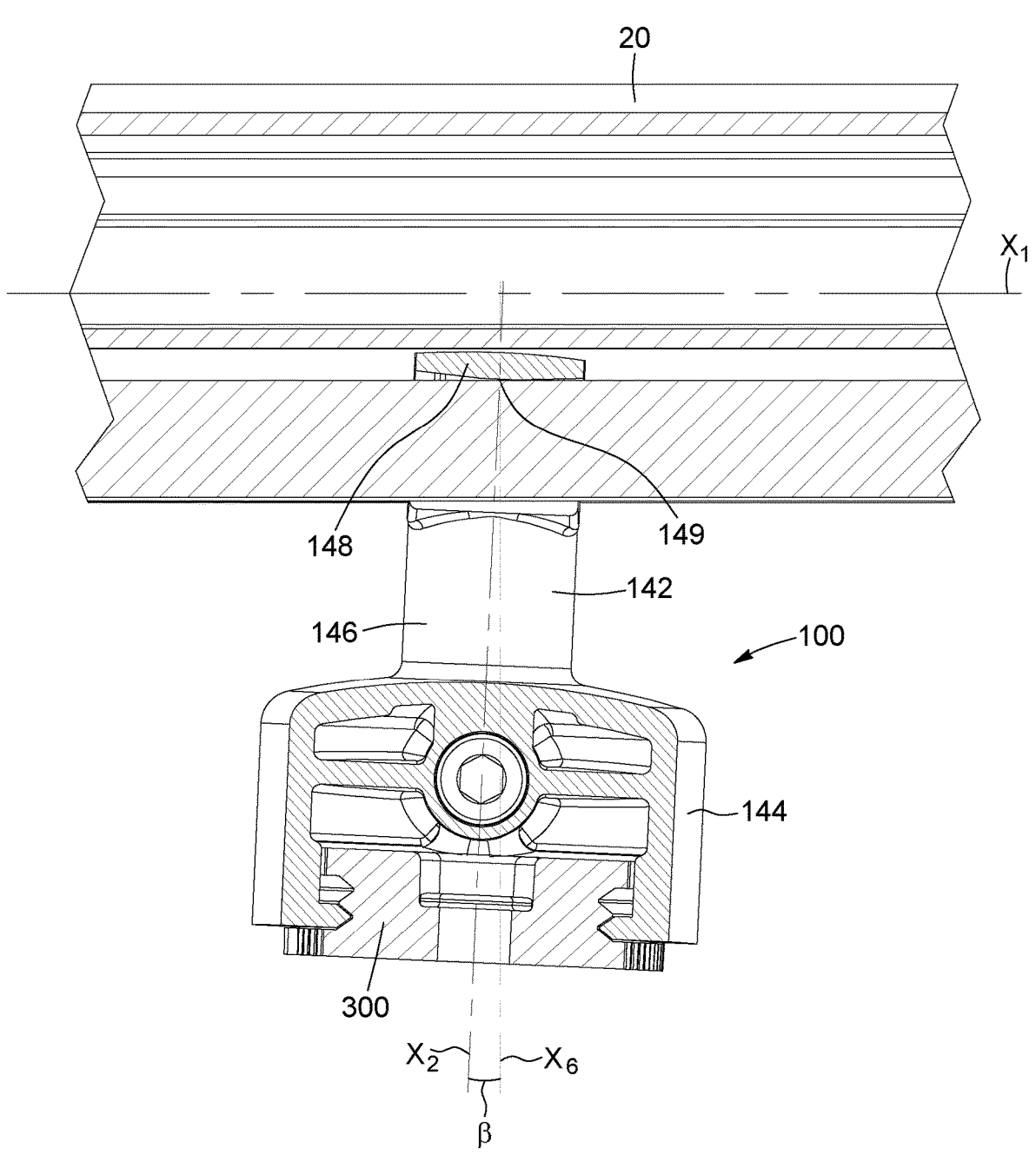
FIG. 4B is a cross-section of the handrail element and the handrail-mounting bracket assembly of FIG. 4A in a second plane substantially perpendicular to the first plane and containing the handrail axis, wherein a handrail-mounting axis is inclined with respect to an axis perpendicular to the handrail axis.

As represented in FIGS. 4A and 4B, the handrail-mounting bracket assembly 100 is also configurable into a mounting configuration (or locked configuration). When the handrail-mounting bracket assembly 100 is configured into the mounting configuration, the first and second connecting members 114, 144 are proximate each other (for instance at least partially contact each other) and are connected to each other. When the handrail-mounting bracket assembly 100 is configured into the mounting configuration, the first and second handrail-mounting members 112, 142 define together a handrail-mounting axis X2 and are locked within the bracket-engaging opening 30. More particularly, the locking end portions 118, 148 of the first and second handrail-mounting members 112, 142 are at least partially engaged in the first and second bracket-engaging slots 40, 42 so that the handrail-mounting bracket assembly 100 (i.e. the first and second handrail-mounting members 112, 142 thereof) is prevented from being pulled out from the bracket-engaging opening 30 along a direction substantially transversal to the handrail axis X1 (i.e. upon traction on the handrail-mounting bracket assembly 100 along a direction substantially parallel to the handrail-mounting axis X2). When configured into the mounting configuration, the first and second connecting members 114, 144 are connected to each other and the handrail-mounting end portion 102 has a second outer cross-section d2 greater than the opening dimension od of the bracket-engaging opening 30.

The outer cross-section of the handrail-mounting end portion 102 (i.e. the largest outer cross-section of the handrail-mounting end portion 102) is defined in the embodiment shown at the locking end portions 118, 148 of the first and second handrail-mounting members 112, 142. The opening dimension of the bracket-engaging opening 30 (or bracket-engaging channel 30) corresponds to the smallest inner cross-section of the bracket-engaging opening 30 and is defined in the embodiment shown at the aperture defined in the inner surface 22 of the handrail element 20 by the bracket-engaging channel 30.

In the mounting configuration (or locked configuration), the handrail-mounting end portion 102 at least partially formed by the first and second handrail-mounting members 112, 142 (for instance at least partially formed by the handrail-engaging heads 123, 153 thereof) has an outer cross-section corresponding substantially to or being slightly greater than an inner cross-section of the bracket-engaging opening 30 of the extruded handrail element 20. Moreover, the engagement teeth 150 are shaped and dimensioned to be at least partially engaged with the inner separation wall 28 (with at least one of the first and second lateral wall portions 36, 38, in the embodiment shown) (i.e. to bite into the inner separation wall 28) so as to limit a displacement of the handrail-mounting bracket assembly 100 in the bracket-engaging channel 30 along a direction substantially parallel to the handrail axis X1 (i.e. in order to limit a longitudinal displacement of the handrail-mounting bracket assembly 100 within the bracket-receiving channel 30). In other words, the handrail-engaging heads 123, 153 of the first and second handrail-mounting members 112, 142 of the first and second handrail-mounting subassemblies 110, 140 are expanded into the handrail element 20 upon connection of the first and second connecting members 114, 144 (i.e. upon configuration of the bracket assembly in the mounting configuration).

Figure 5:
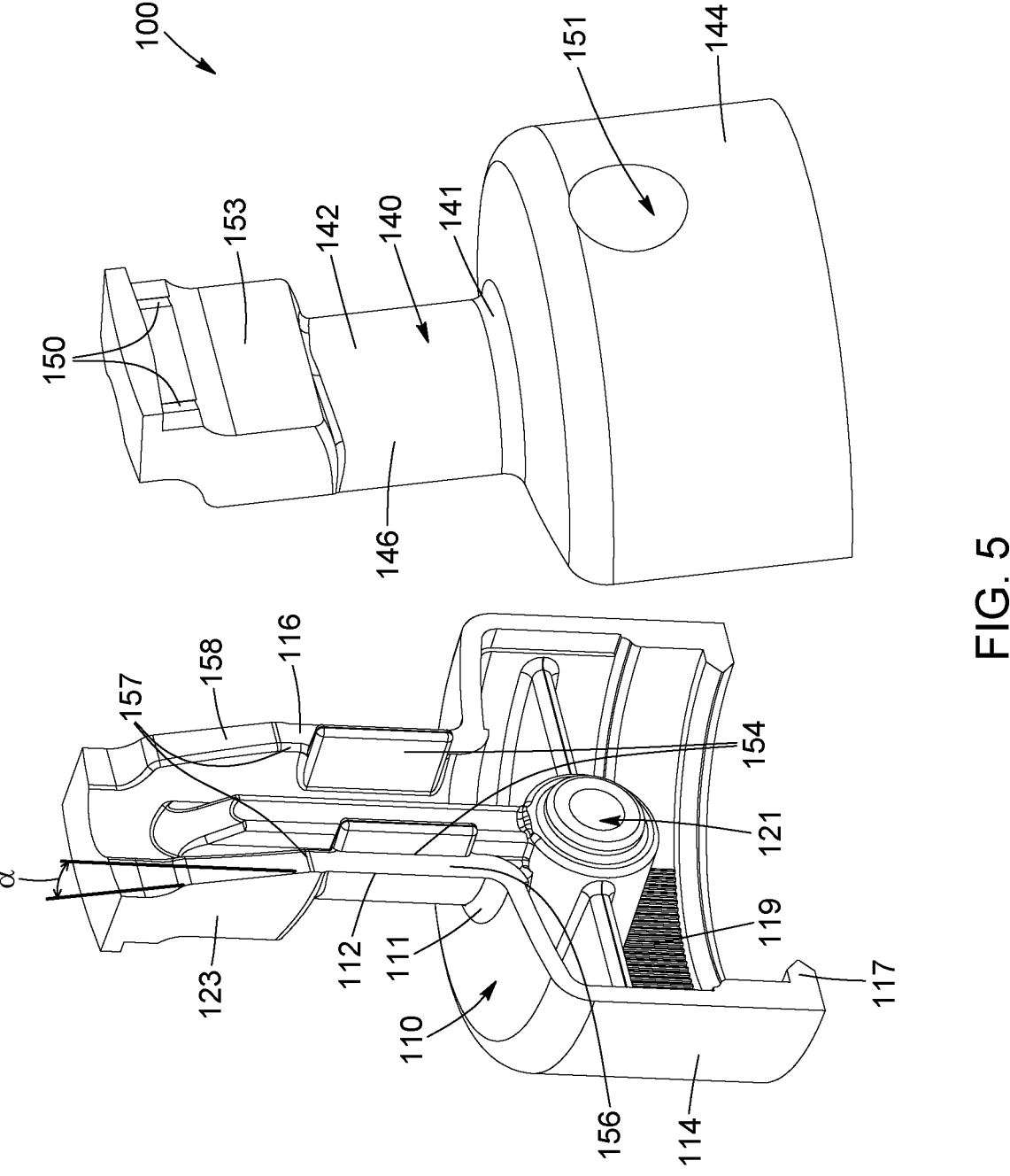
FIG. 5 is a side perspective view of the first and second handrail-mounting subassemblies spaced apart from each other.
Figure 6:
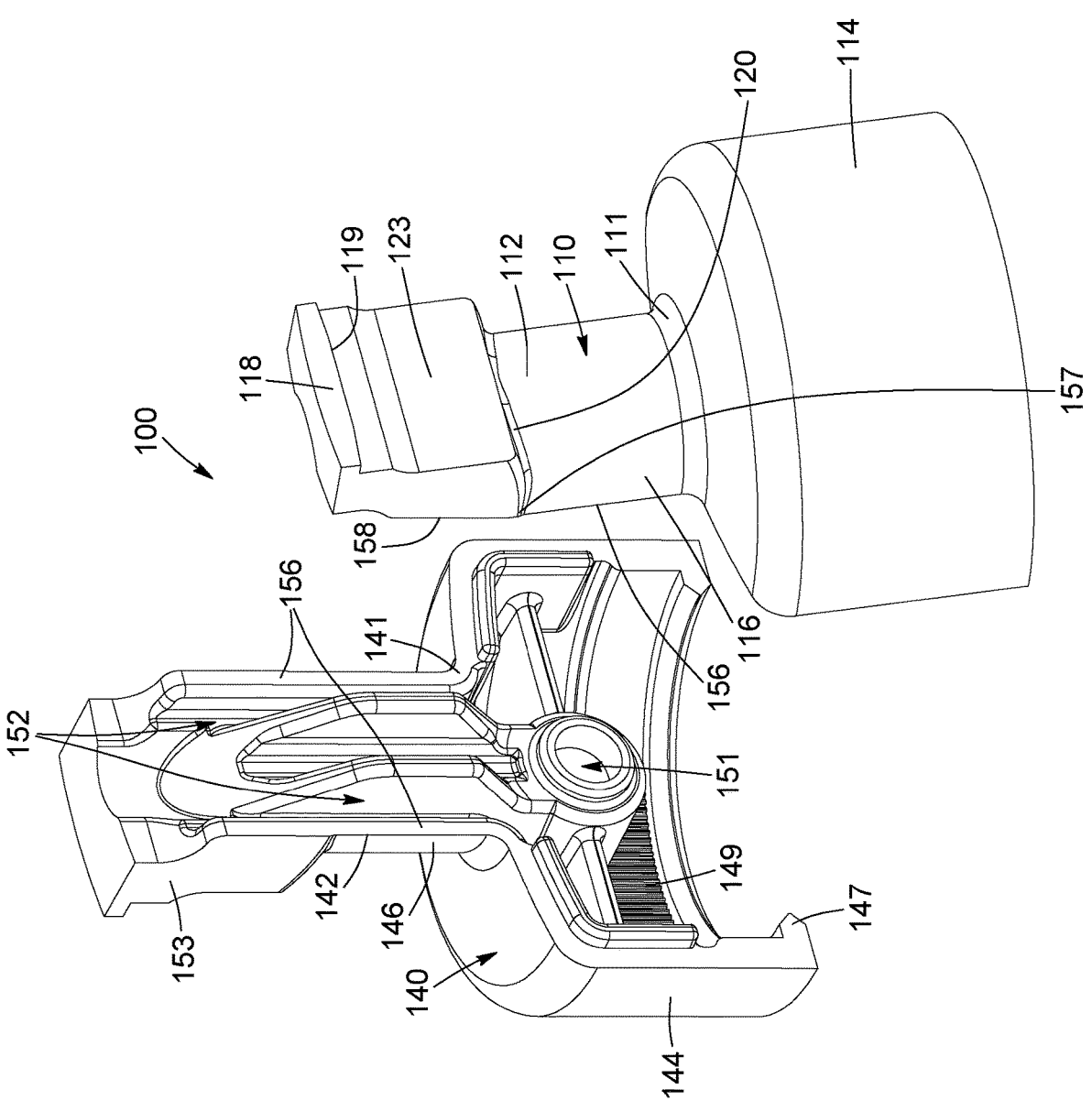
FIG. 6 is another side perspective view of the first and second handrail-mounting subassemblies spaced apart from each other.

As best shown in FIGS. 4B, 5 and 6, the locking end portions 118, 148 have a handrail-contacting surface 119, 149 (or lower surface, in the embodiment shown) comprising a convexity. The locking end portions 118, 148 are thus shaped and dimensioned to allow an inclination angle $\beta$ between the handrail-mounting axis X2 and an axis X6 substantially perpendicular to the handrail axis X1 (for instance between the handrail-mounting axis X2 and a substantially vertical axis X6). It is thus understood that the handrail-mounting bracket assembly is shaped and dimensioned to mount for instance a first handrail element inclined with respect to horizontal to a second handrail element—or post—being substantially vertical. In the embodiment shown, the locking end portions 118, 148 are shaped and dimensioned to allow an inclination angle $\beta$ (or deflection angle $\beta$) greater than about 2 degrees. For instance, the locking end portions 118, 148 are shaped and dimensioned to allow an inclination angle $\beta$ of the order of or greater than about 5 degrees.

In the embodiment shown, the bracket assembly 100 further includes a guiding assembly to facilitate a positioning of the first and second handrail-mounting subassemblies 110, 140 relative to each other in the engagement configuration and to facilitate relative movement of the first and second handrail-mounting subassemblies 110, 140 between the engagement configuration and the mounting configuration. In the embodiment shown, one of the first and second handrail-mounting members 112, 142 comprises at least one guiding member 154 and the other one of the first and second handrail-mounting members 112, 142 comprises at least one guiding recess 152 shaped and dimensioned to at least partially receive the guiding member 154 when the bracket assembly 100 is configured in the mounting configuration.

Specifically, the guiding assembly includes the guiding recesses 152 formed in the second handrail-mounting member 142 of the second handrail-mounting subassembly 140 and the guiding members 154 formed in the first handrail-mounting member 112 of the first handrail-mounting subassembly 110. When the handrail-mounting bracket assembly 100 is in the engagement configuration, the guiding recesses 152 face towards the first handrail-mounting member 112 and the guiding members 154 extend towards the second handrail-mounting member 142 to be receivable in the guiding recesses 152. The guiding members 154 and the guiding recesses 152 are sized and shaped such that when the guiding members 154 are received in the guiding recesses 152, the first and second handrail-mounting subassemblies 110, 140 (the first and second handrail-mounting members 112, 142 thereof in the embodiment shown) are prevented from moving relative to each other in a longitudinal direction relative to the handrail element 20 (i.e. parallel to the handrail axis X1). The guiding members 154 and the guiding recesses 152 are further positioned such that when the guiding members 154 are received in the guiding recesses 152, the first and second handrail-mounting members 112, 142 are longitudinally aligned with each other such that the first and second connecting members 114, 144 of the first and second handrail-mounting subassemblies 110, 140 come together to form a substantially full cylindrical sleeve 159 when the bracket assembly 100 is in the mounting configuration.

It is appreciated that the shape, the configuration of the guiding assembly and/or the shape, the configuration, the number and/or the location of the guiding recesses and/or the guiding members thereof can vary from the embodiment shown.

Moreover, in the embodiment shown, each of the first and second handrail-mounting subassemblies 110, 140 (the first and second handrail-mounting members 112, 142 thereof, in the embodiment shown) includes an abutment surface 156 (FIGS. 5 and 6) facing towards the other one of the first and second handrail-mounting subassemblies 110, 140. When the bracket assembly 100 is in the mounting configuration, the abutment surfaces 156 of the first and second handrail-mounting subassemblies 110, 140 (of the first and second handrail-mounting members 112, 142 thereof in the embodiment shown) abut each other. Still in the embodiment shown, at least one of the first and second handrail-mounting members 112, 142 further includes an inclined surface 158 substantially facing towards the other one of the first and second handrail-mounting members 112, 142. The inclined surface 158 is adjacent the abutment surface 156 of the corresponding one of the first and second handrail-mounting members 112, 142 and is angled relative to the abutment surface 156 to thereby define a fulcrum 157 between the abutment surface 156 and the corresponding inclined surface 158. The fulcrum 157 is shaped and dimensioned to ease the relative pivoting of the handrail-mounting members 112, 142 when the bracket assembly 100 is moved from the engagement configuration to the mounting configuration. In the embodiment shown, the inclined surface 158 and the adjacent abutment surface 156 of the corresponding one of the first and second handrail-mounting members 112, 142 define a bracket inclination angle α greater than about 2 degrees. For instance, the bracket inclination angle α is greater than or substantially equal to about 5 degrees.

When the bracket assembly 100 is in the mounting configuration, the first and second connecting members 114, 144 of the first and second handrail-mounting subassemblies 110, 140 form together the above-mentioned connector-receiving sleeve 159 defining a connector-receiving cavity 160 therebetween. In the embodiment shown, the connector-receiving sleeve 159 at least partially delimiting the connector-receiving cavity 160 is substantially cylindrical and the connector-receiving cavity 160 is at least partially delimited by the inner surfaces 115, 145 of the first and second connecting members 114, 144. As represented in FIG. 4, the connector-receiving cavity 160 is shaped and dimensioned to at least partially receive a coupling connector 300 (or disk-shaped handrail element connector 300—or toothed handrail element connector 300).

Disk-Shaped Handrail Element Connector

As represented in FIGS. 2 to 4, the disk-shaped handrail element connector 300 has a connector axis X3 (corresponding to an axis of the cylindrical connector-receiving cavity 160 when received therein) and comprises first and second opposed faces 302, 304 (or first and second opposed sides 302, 304). In the embodiment shown, the first and second faces 302, 304 are substantially disk-shaped. The disk-shaped handrail element connector 300 comprises first and second opposed connecting portions 310, 320. The first and second opposed connecting portions 310, 320 are placed back-to-back, to connect the handrail-mounting bracket assembly 100 to another handrail element or to a support structure, such as a wall.

In the embodiment shown, the disk-shaped handrail element connector 300 has a plane of symmetry extending transversally (for instance substantially perpendicularly) to the connector axis X3. The first and second connecting portions 310, 320 have thus substantially similar shapes and dimensions so that the following description of the first connecting portion 310 will also apply, unless otherwise stated, to the second connecting portion 320.

In the embodiment shown, the first connecting portion 310 comprises one or more axial couplers 312—considered with respect to the connector axis X3—axially couplable to the inner surface of at least one of the first and second connecting members 114, 144 when at least partially received in the connector-receiving cavity 160 or to an inner surface of a handrail element (not represented) and angular couplers 314 angularly couplable—considered with respect to a rotation about the connector axis X3—to the inner surface of at least one of the first and second connecting members 114, 144 when at least partially received in the connector-receiving cavity 160 or to an inner surface of a handrail element.

In the embodiment shown, the disk-shaped handrail element connector 300 further comprises one or more fastener-receiving through openings 330 shaped and dimensioned for instance to receive corresponding connector fasteners (not represented) for instance to secure the disk-shaped handrail element connector 300 to another handrail element or to a support structure. The handrail element connector 300 further comprises one or more cable-receiving apertures 332 that are shaped and dimensioned to allow the introduction of cables (such as for instance electric cables or wires) within the connector-receiving cavity 160.

When engaged in the connector-receiving cavity 160 formed between the first and second connecting members 114, 144 when the handrail-mounting bracket assembly 100 is configured in the mounting configuration, at least one of the coupling lips 117, 147 of the first and second connecting members 114, 144 is at least partially engaged with at least one of the axial couplers 312 of the first and second connecting portions 310, 320 and at least some of the coupling teeth 119, 149 are at least partially engaged with at least one of the angular couplers 314 of at least one of the first and second connecting portions 310, 320 of the handrail element connector 300. It is thus understood that the handrail-mounting bracket assembly 100 comprises axial blockers formed at least partially by the coupling lips 117, 147 that are shaped and dimensioned to axially couple the first and second handrail-mounting subassemblies 110, 140 (via the first and second connecting members 114, 144 thereof) with the handrail element connector 300 considered with respect to the handrail-mounting axis X2.

The handrail-mounting bracket assembly 100 further comprises angular blockers formed at least partially by the coupling teeth 119, 149 that are shaped and dimensioned to angularly couple the first and second handrail-mounting subassemblies 110, 140 (via the first and second connecting members 114, 144 thereof) with the handrail element connector 300 upon rotation about the connector axis X3 or about the handrail-mounting axis X2.

In the embodiment shown, and without being limitative, the handrail-mounting axis X2 and the connector axis X3 are substantially coaxial with each other.

When the handrail-mounting bracket assembly 100 is configured into the mounting configuration, a mechanical fastener 170 is engaged in fastener-receiving apertures 121, 151 formed in the first and second handrail-mounting subassemblies 110, 140 (for instance formed in the first and second connecting members 114, 144 thereof) so as to maintain the first and second connecting members 114, 144 connected to each other.

It is thus understood that to removably engage the handrail-mounting bracket assembly 100—or multi-pieced—for instance two-pieced—handrail-mounting bracket 100—with the handrail element 20, the handrail-mounting bracket assembly 100 is first configured in the engagement configuration. To this end, the handrail-engaging heads 123, 153 of the first and second handrail-mounting members 112, 142 are pivoted toward each other and the first and second connecting members 114, 144 as well as the bracket bodies 116, 146 of the first and second handrail-mounting members 112, 142 are spaced apart from each other. In the embodiment shown, when the bracket assembly 100 is configured in the engagement configuration, the inclined surface 158 of the first handrail-mounting subassembly 110 (of the first handrail-mounting member 112) abuts the abutment surface 156 of the second handrail-mounting subassembly 140 (of the second handrail-mounting member 142 thereof).

The first and second handrail-mounting members 112, 142 of the first and second handrail-mounting subassemblies 110, 140 (the handrail-engaging heads 123, 153 thereof, in the embodiment shown) are then at least partially inserted into the bracket-receiving channel 30.

The handrail-mounting bracket assembly 100 is then moved to the mounting configuration. Specifically, the handrail-engaging heads 123, 153 of the first and second handrail-mounting members 112, 142 are pivoted away from each other (i.e. are spaced apart from each other) and the first and second connecting members 114, 144, as well as the bracket bodies 116, 146 of the first and second handrail-mounting members 112, 142, are pivoted toward each other so as to at least partially contact each other. The above-mentioned curved outer profiles 120 of the first and second handrail-mounting members 112, 142 ease the pivoting of the first and second handrail-mounting members 112, 142 within the bracket-receiving channel 30. In some embodiments, one the first and second handrail-mounting members 112, 142 pivots up to about 5 degrees when configuring the handrail-mounting bracket assembly 100 from the engagement configuration into the mounting configuration.

In the embodiment shown, when the bracket bodies 116, 146 of the first and second handrail-mounting members 112, 142 and the first and second connecting members 114, 144 are spaced apart from each other (i.e. when the handrail-mounting bracket assembly 100 is configured into the engagement configuration), the disk-shaped handrail element connector 300 is placed between the first and second connecting members 114, 144 so that when the first and second handrail-mounting subassemblies 110, 140 are displaced with regard to each other for the handrail-mounting bracket assembly 100 to be configured into the mounting configuration, the disk-shaped handrail element connector 300 is clamped (or sandwiched) between the first and second connecting members 114, 144 (for instance between connecting end portions or distal end portions thereof) while the first and second handrail-mounting members 112, 142 (the proximal end portions thereof) engage in the bracket-receiving channel 30. It is thus understood that, in this first shown embodiment, the handrail-mounting bracket assembly 100 is shaped and dimensioned to allow a substantially simultaneous clamping of the disk-shaped handrail element connector 300 and the extruded handrail element 20 by the first and second handrail-mounting subassemblies 110, 140 upon configuration of the handrail-mounting bracket assembly 100 into the mounting configuration.

As represented in FIGS. 2 to 4, when the handrail-mounting bracket assembly 100 is configured into the engagement configuration, the first and second handrail-mounting subassemblies 110, 140 are substantially inclined relative to each other. The engagement configuration could thus also be referred to as an angled configuration.

As represented in FIG. 3, when configured into the engagement configuration, the above-mentioned bracket inclination angle α is defined between the first and second handrail-mounting members 112, 142 of the first and second handrail-mounting subassemblies 110, 140.

In the mounting configuration, the first and second handrail-mounting subassemblies 110, 140 are substantially aligned with each other, and the first and second handrail-mounting members 112, 142 thereof both extend substantially parallel to the handrail-mounting axis X2. As mentioned above, the connecting members 114, 144 have a cross-section greater than a cross-section of the handrail-mounting members 112, 142 (of the bracket bodies 116, 146—or intermediate portions 116, 146—and the handrail-mounting portions thereof), so that, in the mounting configuration, the handrail-mounting bracket assembly 100 is substantially T-shaped.

In the embodiment shown, the handrail element connector 300 provides a connection interface between the extruded handrail element 20 having the handrail-mounting bracket assembly 100 engaged therewith, and another handrail element (not represented) or a support surface (not represented), so as to form a section of a handrail assembly. It is appreciated that the shape, the configuration and the location of the handrail element connector 300 is not limited to the embodiment shown. In other words, the multi-pieced (for instance two-pieced in the embodiment shown) handrail-mounting bracket 100 could be shaped and dimensioned to cooperate with any other type of handrail element connector. Moreover, the present disclosure is not limited to a handrail-mounting bracket assembly 100 that would be configured to cooperate with a handrail element connector (for instance with a disk-shaped handrail element connector, as in the embodiment shown) to connect the handrail element 20 with which the handrail-mounting bracket assembly 100 is engaged and another component of a handrail assembly. For instance, in another embodiment (not represented), the handrail-mounting bracket assembly could be shaped and dimensioned to be directly engaged with another component of a handrail assembly (such as another handrail element, a handrail post, a support structure, or the like) for instance via a peripheral flange extending outwardly from at least one of the first and second handrail-mounting subassemblies 110, 140 and securable (for instance via mechanical fasteners engageable in fastener-receiving apertures formed therein) to the other component of the handrail assembly.

Moreover, in the embodiment shown, the first and second handrail-mounting subassemblies 110, 140 are substantially hollow so that wires (such as electrical wires) can be introduced in the two-pieced handrail-mounting bracket and the handrail element engaged therewith.

It is appreciated that the shape and the configuration of the handrail-mounting bracket assembly, and more particularly the shape, the configuration, the relative arrangement of the first and second handrail-mounting members and the first and second connecting members thereof can vary from the embodiment shown in FIGS. 2 to 6.

Two-Pieced L-Shaped Handrail-Mounting Bracket

For instance, FIGS. 7 to 9 and FIGS. 10 to 13 represent two possible embodiments of substantially L-shaped handrail-mounting bracket assemblies 200, 400.

1$^{st}$ Embodiment of a Two-Pieced L-Shaped Handrail-Mounting Bracket

Figure 7:
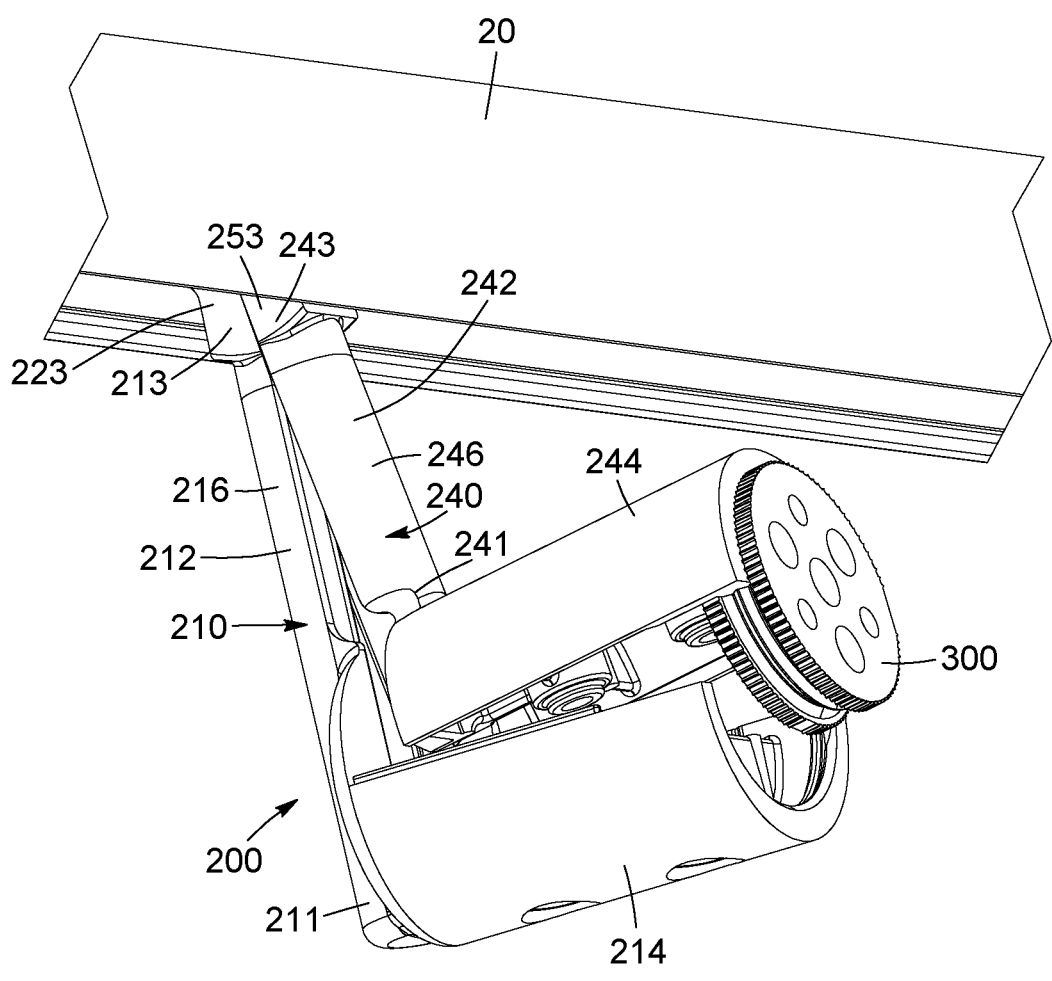
FIG. 7 is a side perspective view of a handrail element and a handrail-mounting bracket assembly in accordance with another embodiment, the handrail-mounting bracket assembly being substantially L-shaped and configured in the engagement configuration.
Figure 8:
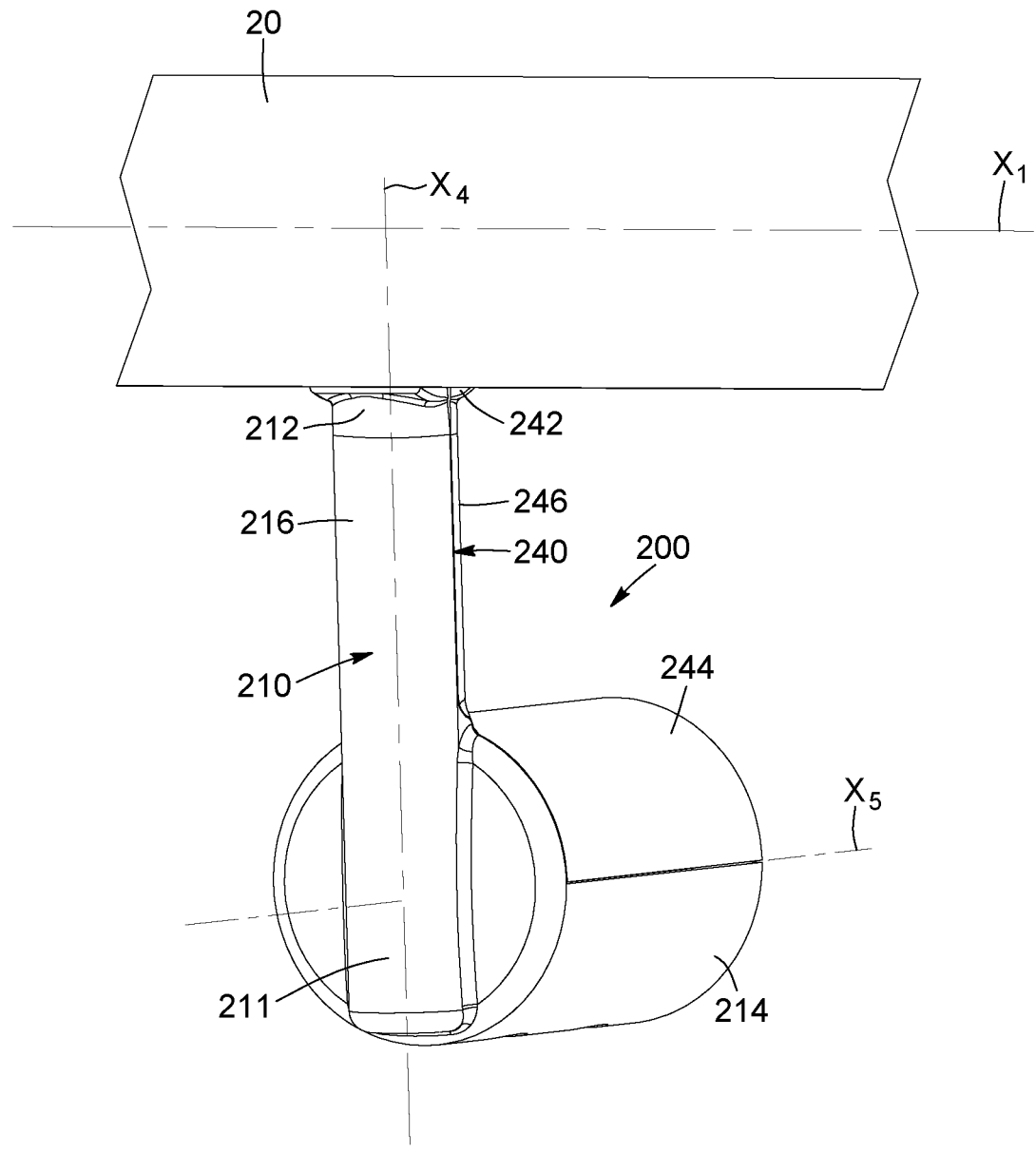
FIG. 8 is another side perspective view of the handrail element and the handrail-mounting bracket assembly of FIG. 7, the handrail-mounting bracket assembly being configured in the locked configuration.
Figure 9:
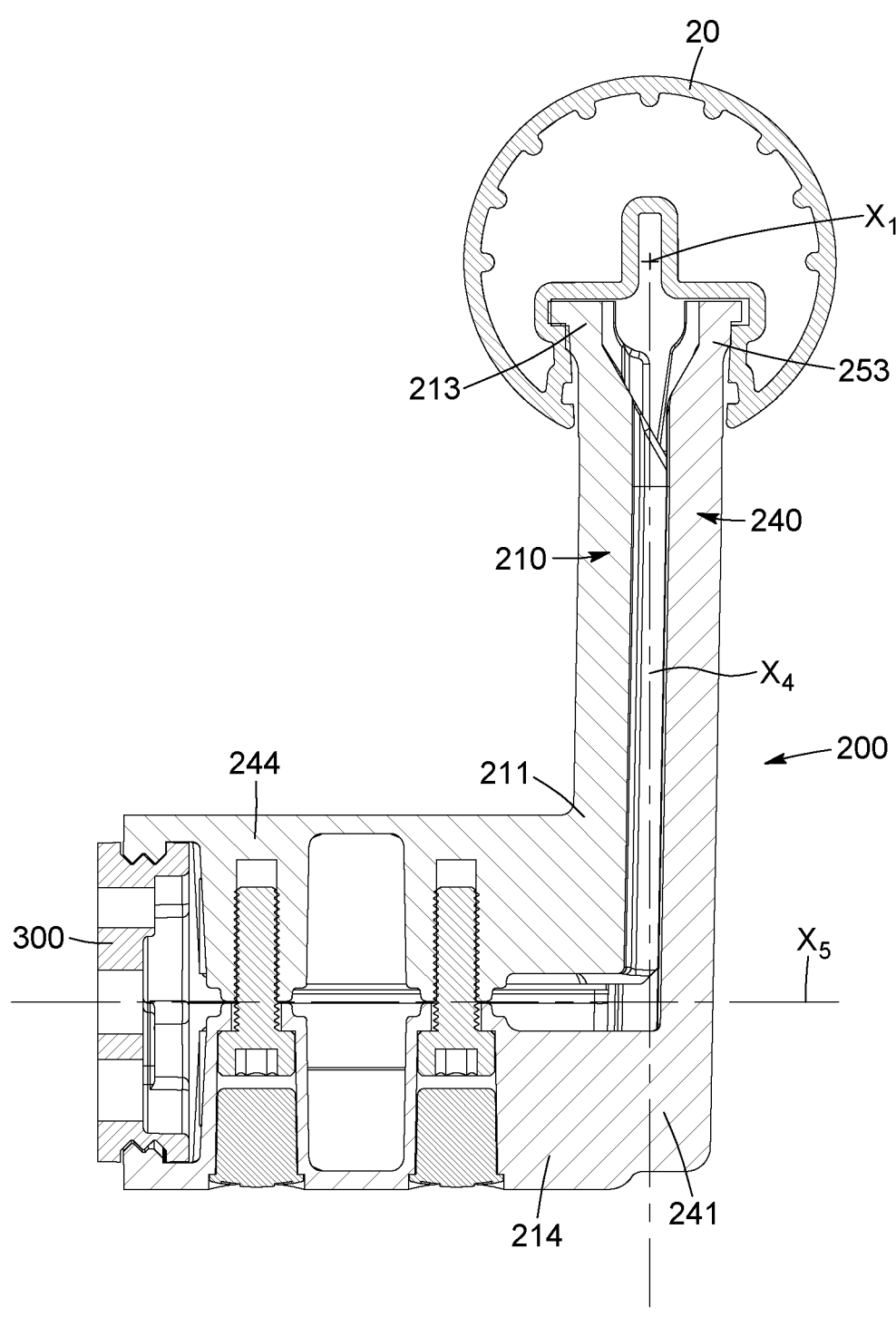
FIG. 9 is a cross-section view of the handrail element and the handrail-mounting bracket assembly of FIG. 8.

As represented in FIGS. 7 to 9, the L-shaped handrail-mounting bracket assembly 200 (or multi-pieced L-shaped handrail-mounting bracket 200) is shaped and dimensioned to be removably engaged with an extruded handrail element 20 as the one with which the above-described T-shaped handrail-mounting bracket assembly 100 is removably engageable.

Similarly to the T-shaped handrail-mounting bracket assembly 100, the L-shaped handrail-mounting bracket assembly 200 comprises first and second handrail-mounting subassemblies 210, 240 displaceable with respect to each other for the handrail-mounting bracket assembly 200 to be configurable into an engagement configuration (see FIG. 7) and into a mounting or locked configuration (see FIGS. 8 and 9).

The first and second handrail-mounting subassemblies 210, 240 comprise respectively first and second handrail-mounting members 212, 242 and first and second connecting members 214, 244.

Similarly to the first embodiment, the first and second handrail-mounting members 212, 242 have a handrail-mounting portion 213, 243 comprising a handrail-engaging head 223, 253. The first and second handrail-mounting members 212, 242 also comprise opposed hood-mounting portions 211, 241 (formed integral with the first and second connecting members 214, 244 in the embodiment shown) and first and second intermediate portions 216, 246 (or bracket bodies 216, 246) extending between the handrail-mounting portions and the hood-mounting portions.

When the handrail-mounting bracket assembly 200 is configured into the mounting configuration, the first and second mounting members 212, 242 define together a handrail-mounting axis X4 extending substantially perpendicularly to the handrail axis X1, in the embodiment shown. When in the mounting configuration, the first and second connecting members 214, 244 define together a connector axis X5 extending substantially transversally (substantially perpendicularly, in the embodiment shown) to the handrail-mounting axis X4. For instance, in the embodiment shown, and as best shown in FIG. 9, the connector axis X5 defined by the assembled connecting members 214, 244 is substantially transversal (for instance substantially perpendicular) to the handrail axis X1 when the handrail-mounting bracket assembly 200 is configured in the mounting configuration and engaged with the handrail element 20.

In the embodiment shown, the handrail-mounting bracket assembly 200 is also shaped and dimensioned to cooperate with a disk-shaped handrail element connector 300 but it could also be conceived an L-shaped handrail-mounting bracket assembly that would shaped and dimensioned to form a section of a handrail assembly (i.e. to connect the handrail element 20 with another component of the handrail assembly) without a disk-shaped handrail element connector 300 being clamped between the first and second handrail-mounting subassemblies 210, 240 or being shaped and dimensioned to cooperate with any other type of handrail element connector.

Moreover, the present disclosure is not limited to handrail-mounting bracket assemblies that would be shaped and dimensioned to be engaged with an extruded handrail element.

2$^{nd}$ Embodiment of a Two-Pieced L-Shaped Handrail-Mounting Bracket

As represented in FIGS. 10 to 13, the L-shaped handrail-mounting bracket assembly 400 can be removably engageable with a substantially tubular handrail element 40 (or pipe element 40), such as an existing, off-the-shelf pipe of desired dimensions. In the embodiment shown, the pipe element 40 has a substantially circular cross-section and comprises a substantially cylindrical inner cavity 42 at least partially delimited by a tubular peripheral wall 44 of the pipe element 40. Moreover, a bracket-receiving aperture 46 (or bracket-engaging opening 46) for instance substantially circular, in the embodiment shown, is formed in the tubular peripheral wall 44 and opens into the inner cavity 42. Even though FIGS. 10 to 13 represent an L-shaped handrail-mounting bracket assembly removably mountable to a substantially tubular handrail element with a bracket-receiving aperture formed therein, it is understood that it could also be conceived a T-shaped handrail-mounting bracket assembly or a handrail-mounting bracket assembly having any other shape that would be configured to be removably mounted to an off-the-shelf pipe with a bracket-receiving aperture formed therein.

Similarly to the above-described embodiments, the L-shaped handrail-mounting bracket assembly 400 has first and second displaceable handrail-mounting subassemblies 410, 440. The first and second handrail-mounting subassemblies 410, 440 comprise respectively first and second hand-rail-mounting members 412, 442 and first and second connecting members 414, 444.

Similarly to the above-described embodiments, the first and second handrail-mounting members 412, 442 have a handrail-mounting portion 413, 443 comprising a handrail-engaging head 423, 453. The first and second handrail-mounting members 412, 442 also comprise opposed hood-mounting portions 411, 441 (formed integral with the first and second connecting members 414, 444 in the embodiment shown) and first and second intermediate portions 416, 446 (or first and second bracket bodies 416, 446) extending between the handrail-mounting portions and the hood-mounting portions.

Figure 13:
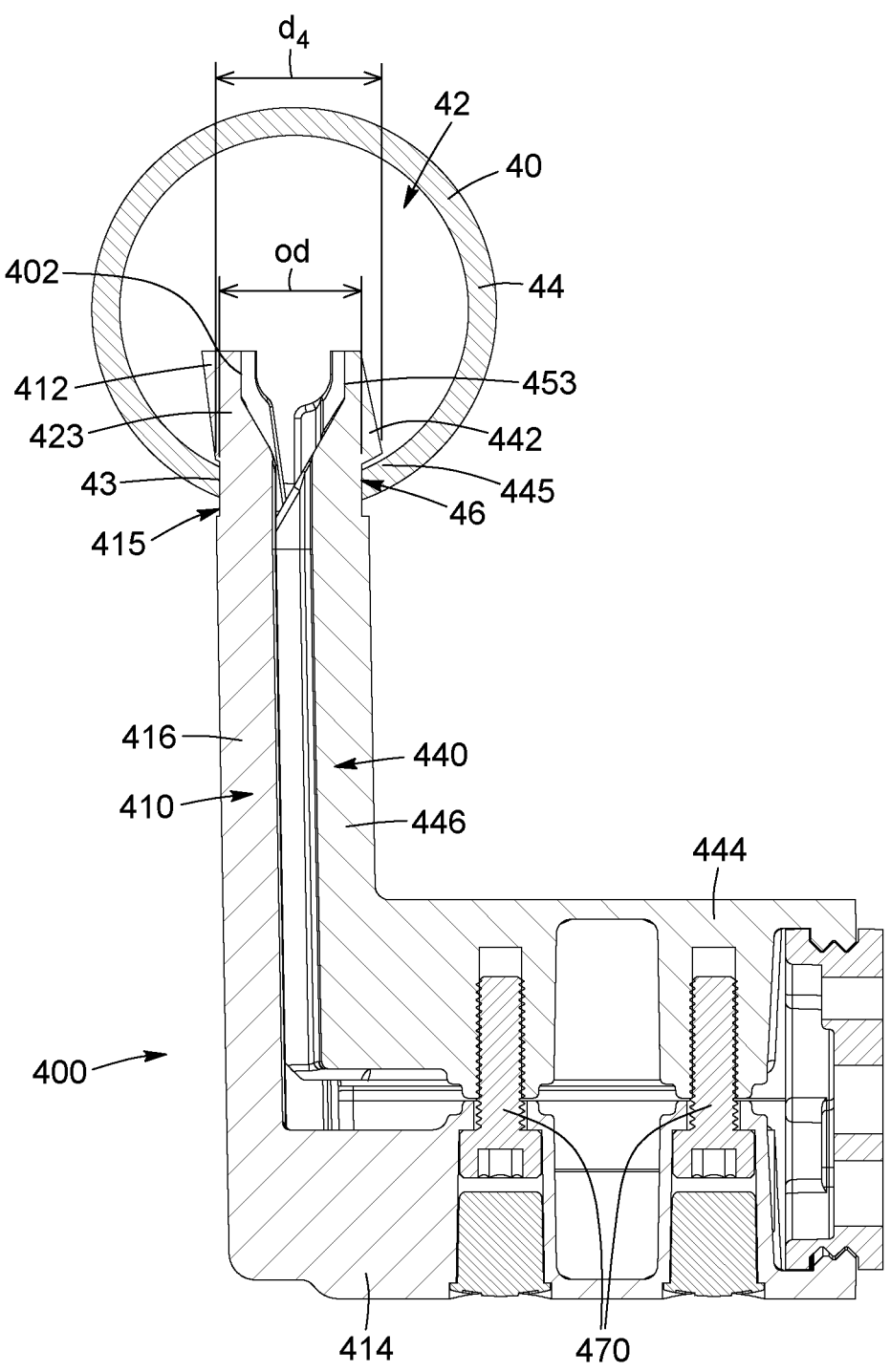
FIG. 13 is a cross-section view of the handrail element and the handrail-mounting bracket assembly of FIG. 12.

As represented in FIG. 13, first and second handrail-receiving slots 415, 445 (or first and second handrail-receiving recesses 415, 445, or first and second handrail-mounting recesses 415, 445) are formed respectively in the first and second handrail-mounting members 412, 442, for instance between (or at a junction of) the handrail-engaging heads 423, 453 and the first and second intermediate portions 416, 446 (or first and second bracket bodies 416, 446).

When the handrail-mounting bracket assembly 400 is configured into the engagement configuration, the handrail-engaging heads 423, 453 of the first and second handrail-mounting members 412, 442 are pivoted toward each other for the handrail-engaging heads 423, 453 to be at least partially introduced into the bracket-receiving aperture 46 (or bracket-engaging opening 46). Once the first and second handrail-engaging heads 423, 453 of the first and second handrail-mounting members 412, 442 are at least partially engaged in the inner cavity 42 of the pipe element 40, the first and second connecting members 414, 444 as well as the first and second bracket bodies 416, 446 are pivoted toward each other (i.e. the handrail-mounting bracket assembly 400 is configured in the mounting configuration) so that a peripheral border 43 at least partially delimiting the bracket-receiving aperture 46 (or bracket-engaging opening 46) is at least partially received in the first and second handrail-receiving recesses 415, 445. In other words, the peripheral border 43 is at least partially sandwiched between the first and second handrail-engaging heads 423, 453 and the first and second bracket bodies 416, 446 of the first and second handrail-mounting members 412, 442 when the bracket assembly 400 is configured in the mounting configuration.

Moreover, mechanical fasteners 470 are engaged in fastener-receiving apertures 421, 451 formed in the first and second handrail-mounting subassemblies 410, 440 (for instance in the first and second connecting members 414, 444 thereof, in the embodiment shown) so as to connect together the first and second handrail-mounting subassemblies 410, 440.

The handrail-mounting end portion 402 of the handrail-mounting bracket assembly 400 at least partially formed by the handrail-engaging heads 423, 453 of the first and second handrail-mounting portions 412, 442 has an outer cross-section d4 that is greater than an aperture dimension ad of the bracket-receiving aperture 46 (or bracket-engaging opening 46), as represented in FIG. 13; the first and second handrail-mounting members 412, 442 (the handrail-engaging heads 423, 453 thereof, in the embodiment shown) are thus maintained in the inner cavity 42 of the pipe element 40 (i.e. the handrail-mounting bracket assembly 400 is prevented from being accidentally disengaged from the tubular element 40).

In the embodiment shown, the handrail-mounting bracket assembly 400 is also shaped and dimensioned to cooperate with a disk-shaped handrail element connector 300—or toothed handrail element connector 300—but it could also be conceived an L-shaped handrail-mounting bracket assembly that would shaped and dimensioned to form a section of a handrail assembly (i.e. to connect the handrail element 40 with another component of the handrail assembly) without a disk-shaped handrail element connector 300 being clamped between the first and second handrail-mounting subassemblies 410, 440 or that would be shaped and dimensioned to cooperate with a handrail element connector having any other shape.

It is appreciated that the shape, the configuration of the handrail-mounting bracket assemblies and the shape, the configuration and the relative arrangement of the first and second handrail-mounting members thereof can vary from the embodiments shown.

Four-Pieced L-Shaped Handrail-Mounting Bracket

For instance, even though the above-described embodiments of the handrail-mounting bracket assembly comprise first and second handrail-mounting subassemblies wherein each of the first and second handrail-mounting subassemblies are integrally formed as two single components, it could also be conceived a multi-pieced handrail-mounting bracket wherein at least one of the first and second handrail-mounting subassemblies would be formed of a plurality (for instance two) distinct elements securable (for instance mountable, for instance removably securable) together.

In the embodiment shown in FIGS. 14 to 19, the handrail-mounting bracket assembly 500 comprises a first handrail-mounting subassembly 510 including a first handrail-mounting member 512 and a first connecting member 514; a second handrail-mounting subassembly 540 including a second handrail-mounting member 542 and a second connecting member 544. Similarly to the above-described embodiments, the bracket assembly 500 is selectively configurable in an engagement configuration in which the first and second handrail-mounting members 512, 542 are at least partially insertable into a bracket-engaging opening 30 of the first handrail element 20, and in a mounting configuration wherein the first and second handrail-mounting members 512, 542 form together a handrail-mounting end portion 502 of the bracket assembly 500 and are locked with the first handrail element 20 so as to prevent removal of the bracket assembly 500 (of the first and second handrail-mounting members thereof, in the embodiment shown) from the bracket-engaging opening 30 once inserted therein. In other words, the multi-pieced handrail-mounting bracket 500 is configurable into the engagement configuration in which the handrail-mounting end portion 502 has a first cross-section smaller than an opening dimension of the bracket-engaging opening 30, and into the mounting configuration wherein the first and second handrail-mounting members 512, 542 are connected to each other and the handrail-mounting end portion 502 has a second cross-section greater than the opening dimension of the bracket-engaging opening.

In the embodiment shown, each of the first and second handrail-mounting members 512, 542 has (or is dividable into) a handrail-mounting portion 513, 553 (or first and second proximal end portions 513, 543, considered with respect to the bracket-engaging opening 30 when the bracket assembly is configured in the mounting configuration), an opposed hood-mounting portion 511, 541 and a bracket body 516, 546 (or intermediate portion 516, 546) therebetween.

For instance, the bracket bodies 516, 546 of the first and second handrail-mounting members 512, 542 are substantially semi-cylindrical and/or substantially hollow.

For instance, at least one of the first and second handrail-mounting members 512, 542 (both of them, in the embodiment shown) comprises a handrail-engaging head 523, 553 forming at least partially the corresponding handrail-mounting portion 513, 543, the handrail-engaging head 523, 553 having a cross-section greater than a cross-section of the corresponding bracket body 516, 546.

For instance, at least one of the first and second handrail-mounting members 512, 542 (both of them, in the embodiment shown) comprises a substantially curved outer profile 520 at a junction of the handrail-engaging head 523, 553 and the corresponding bracket body 516, 546.

For instance, at least one of the first and second handrail-engaging heads 523, 553 comprises one or more handrail-engaging teeth 550 protruding outwardly from an outer surface thereof. At least one of the first and second handrail-engaging heads 523, 553 (both of them, in the embodiment shown) comprises a locking end portion 518, 548, an outer cross-section of the corresponding handrail engaging head 523, 553 increasing towards the corresponding locking end portion 518, 548.

Figure 14:
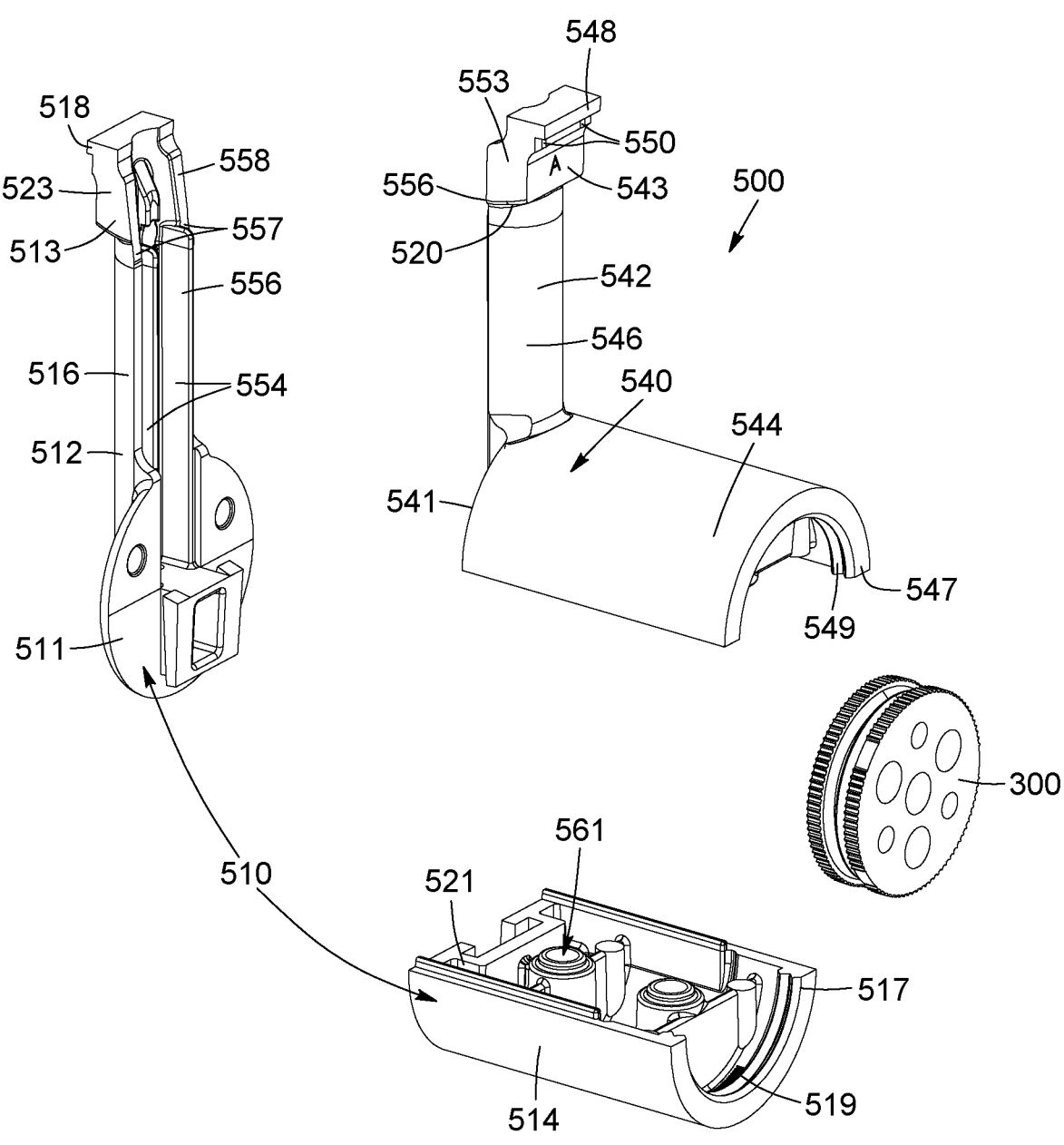
FIG. 14 is a side perspective view, exploded, of a handrail-mounting bracket assembly in accordance with another embodiment, the bracket assembly comprising a single-pieced first handrail-mounting subassembly and a two-pieced second handrail-mounting subassembly.
Figure 15:
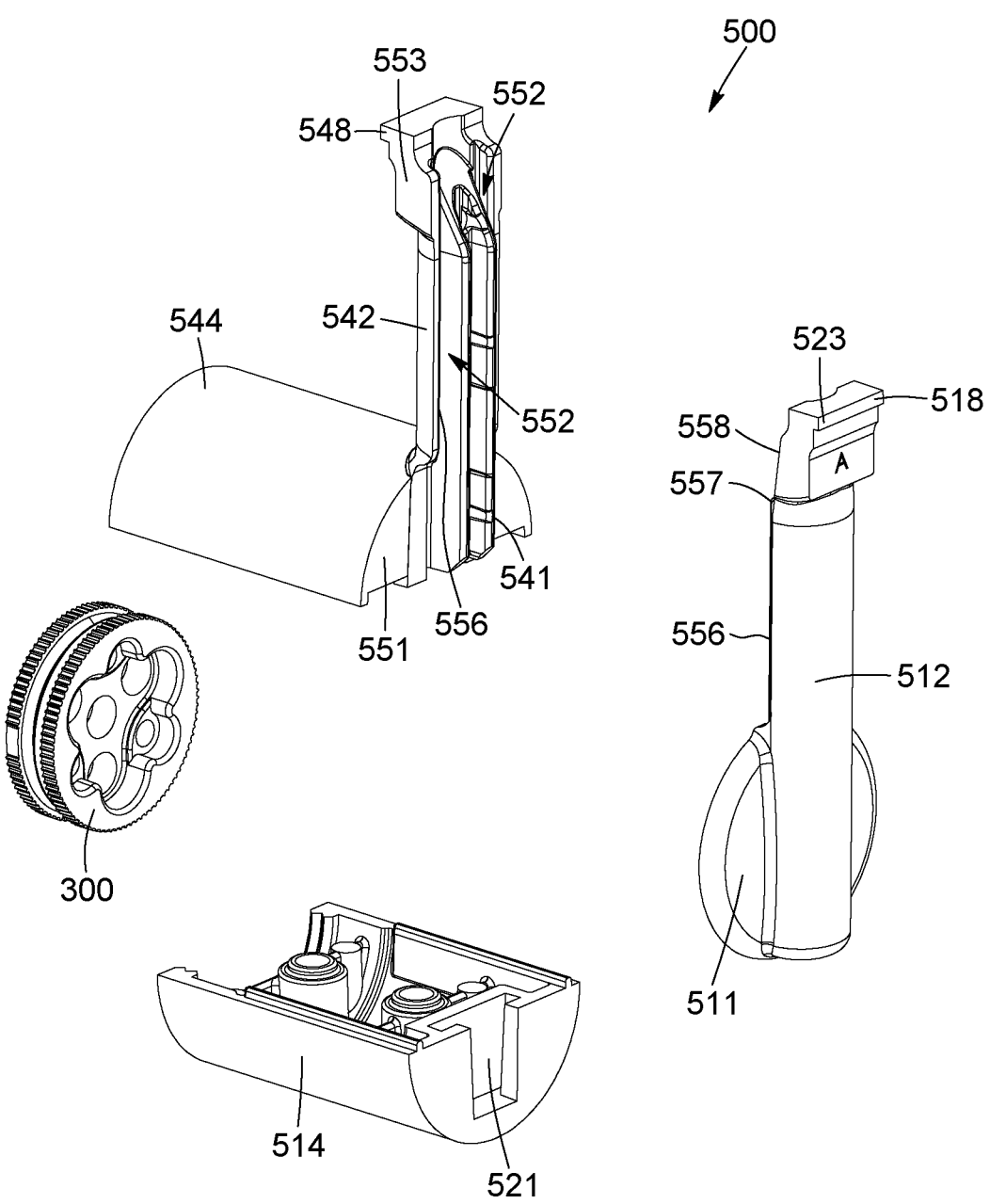
FIG. 15 is another side perspective view, exploded, of the handrail-mounting bracket assembly of FIG. 14.

As best shown in FIGS. 14 and 15, the first and second handrail-mounting members 512, 542 comprise an abutment surface 556 facing each other and at least partially abutting each other when the bracket assembly 500 is in the mounting configuration. One of the first and second handrail-mounting members 512, 542 comprises an inclined surface 558 at the handrail-engaging head 553 thereof substantially facing the other one of the first and second handrail-mounting members and adjacent the abutment surface 542 of the one of the first and second handrail-mounting members 512, 542 and is angled relative to the abutment surface 556 to thereby define a fulcrum 557. For instance, the inclined surface and the adjacent abutment surface define a bracket inclination angle greater than about 2 degrees, for instance greater than or of the order of about 5 degrees.

As best shown in FIGS. 14 and 15, one of the first and second handrail-mounting members 512, 542 comprises at least one guiding member 554 and the other one of the first and second handrail-mounting members comprises at least one guiding recess 552 shaped and dimensioned to at least partially receive the guiding members 554 when the bracket assembly 500 is configured in the mounting configuration. In the embodiment shown, the guiding recesses 552 face towards the one of the first and second handrail-mounting members and the guiding members 554 extends towards the other one of the first and second handrail-mounting members to be received in the guiding recesses 552 when the bracket assembly is configured from the engagement configuration towards the mounting configuration.

Similarly to the above-described embodiments, the first and second connecting members 514, 544 form together a connector-receiving sleeve 559 defining a connector-receiving cavity 560 when the bracket assembly 500 is configured in the mounting configuration. For instance, the connector-receiving sleeve 559 delimiting the connector-receiving cavity 560—or disk-receiving cavity 560—is substantially cylindrical.

In the embodiment shown, at least one of the first and second connecting members 514, 544 (both of them, in the embodiment shown) comprises at least one of axial and angular blockers 517, 547, 519, 549 engageable with a connecting member 300 providing a connection interface between the first handrail element and the second handrail element or the support structure.

Figure 18:
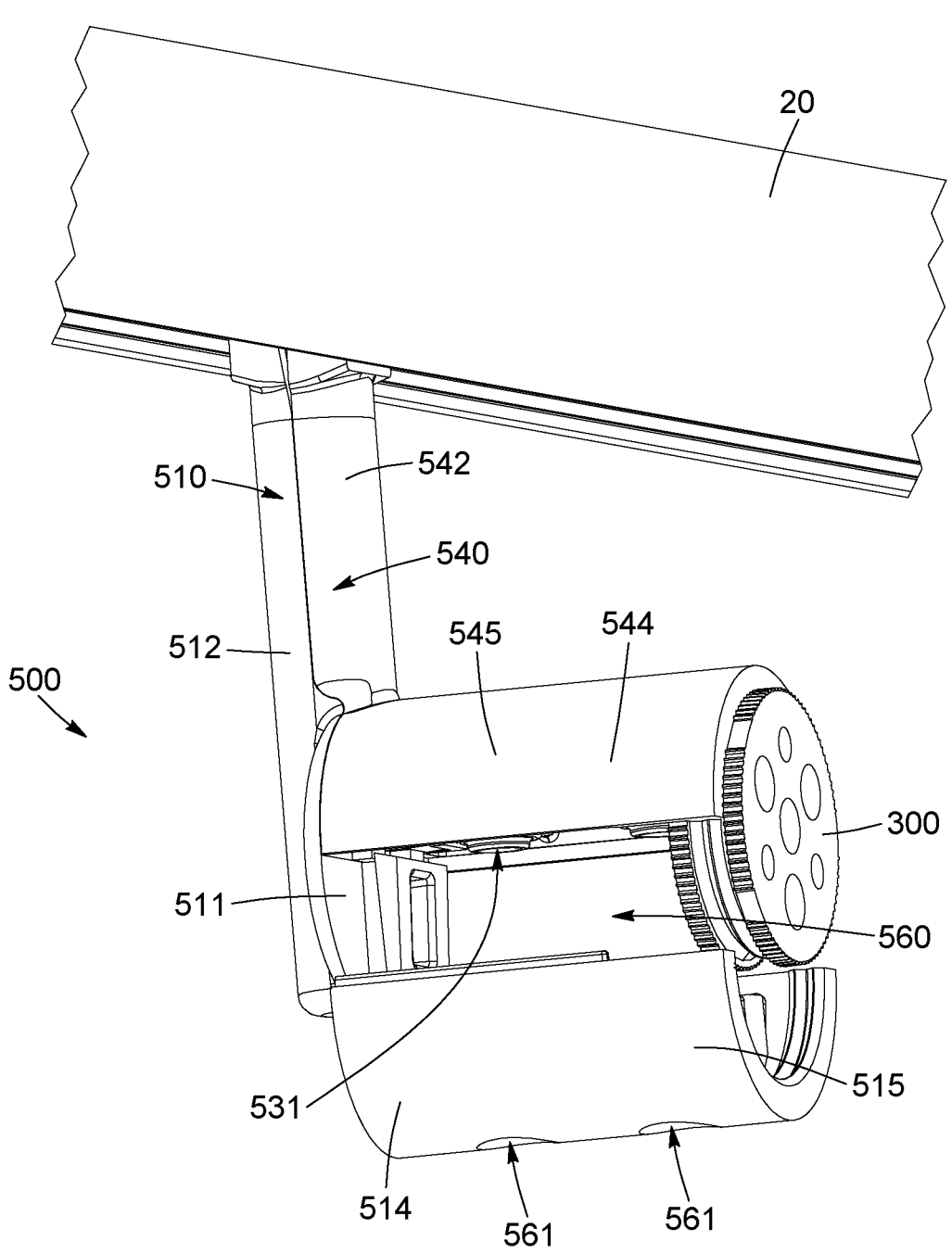
FIG. 18 is a side perspective view of the handrail-mounting bracket assembly of FIG. 14, a second connecting member of the second handrail-mounting subassembly being connected with the first connecting member of the first handrail-mounting subassembly.
Figure 19:
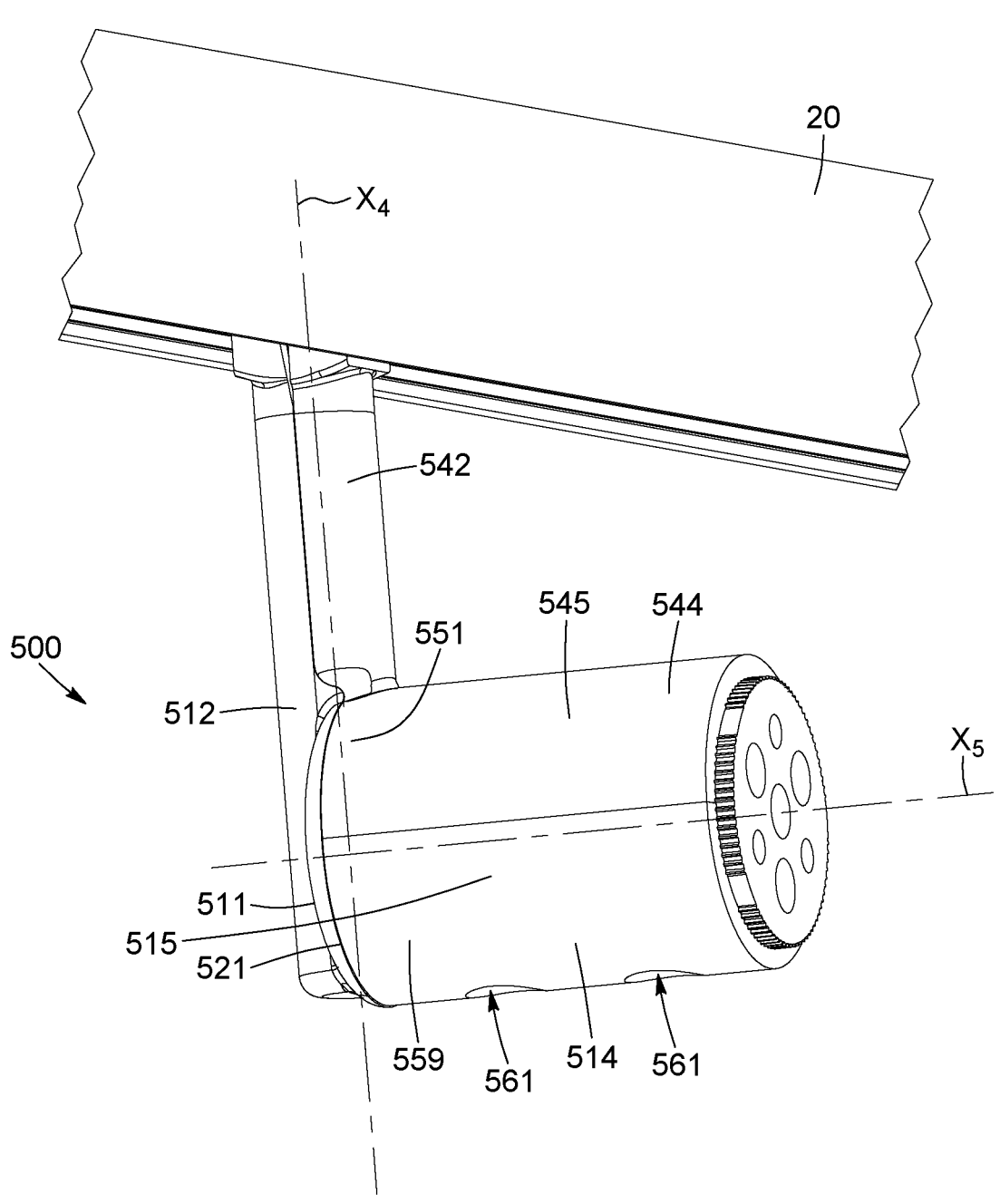
FIG. 19 is a side perspective view of the handrail-mounting bracket assembly of FIG. 14 in the mounting configuration.

As best shown in FIGS. 18 and 19, one or more fastener-receiving apertures 521, 551 is formed in one of the first and second handrail-mounting bracket subassemblies 510, 540 (for instance in at least one of the first and second connecting members 514, 544 thereof).

As best shown in FIGS. 15 and 15, at least one of the first and second handrail-mounting subassemblies 510, 540 is substantially hollow (for instance at least one of the first and second handrail-mounting members and the first and second connecting members thereof).

As best shown in FIGS. 14 and 15 and without being limitative, the hood-mounting portion 511 of the first handrail-mounting member 512 is removably securable to a proximal end portion 521 of the first connecting member 514, whereas the hood-mounting portion of the second handrail-mounting member is formed integral with a proximal end portion of the second connecting member (i.e. the first handrail-mounting subassembly is multi-pieced whereas the second handrail-mounting assembly is multi-pieced—for instance two-pieced).

In the embodiment shown, the hood-mounting portion 511 of the first handrail-mounting member and the proximal end portion 521 of the first connecting member comprise male and female dovetail joints cooperating with each other to removably secure (for instance removably mount) the first handrail-mounting member 512 to the first connecting member 514. Other mechanical fasteners could be conceived on the first handrail-mounting member 512 and the first connecting member 514 to removably secure them together.

Figure 16:
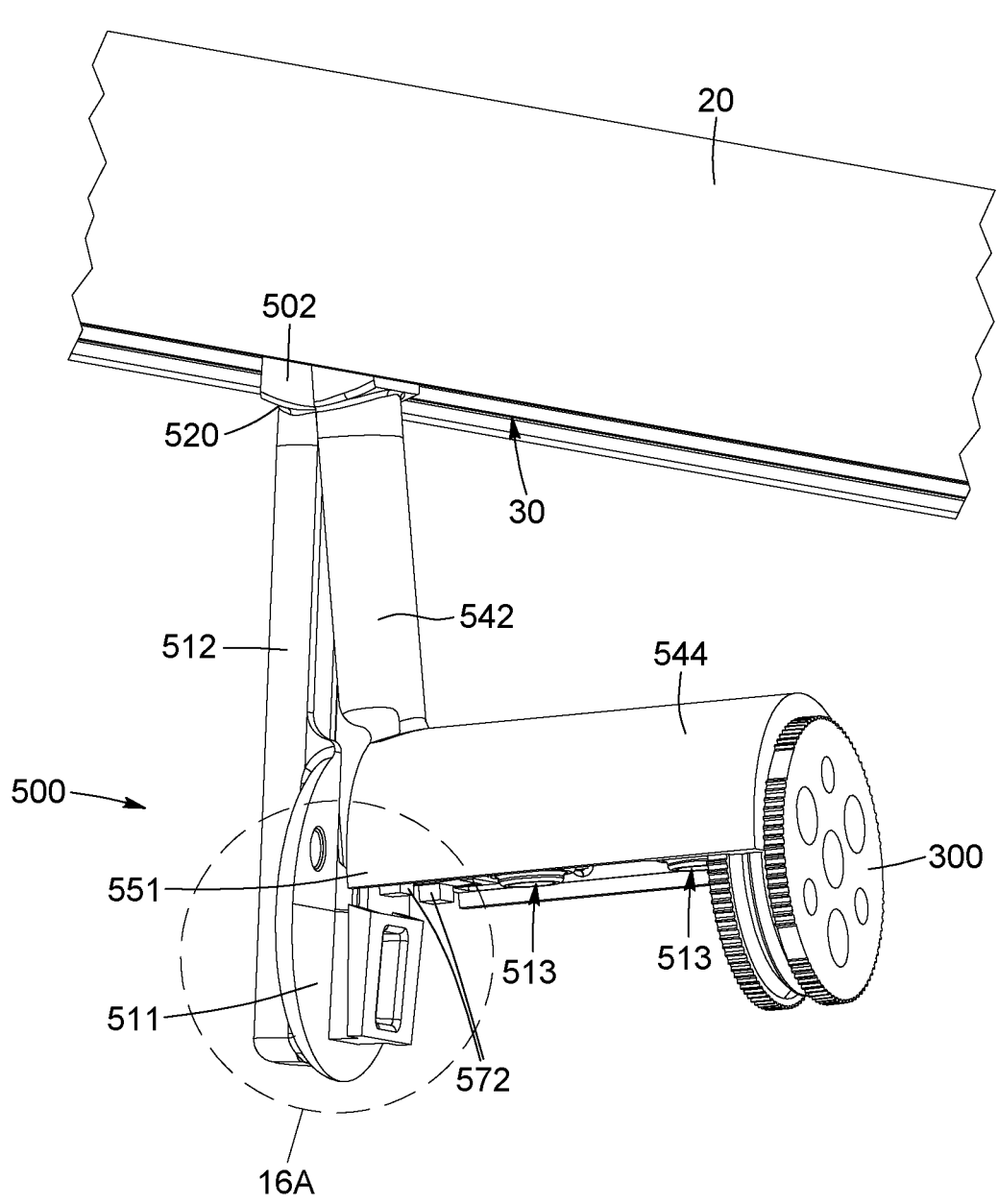
FIG. 16 is a side perspective view of the handrail-mounting bracket assembly of FIG. 14 in the engagement configuration.
Figure 16A:
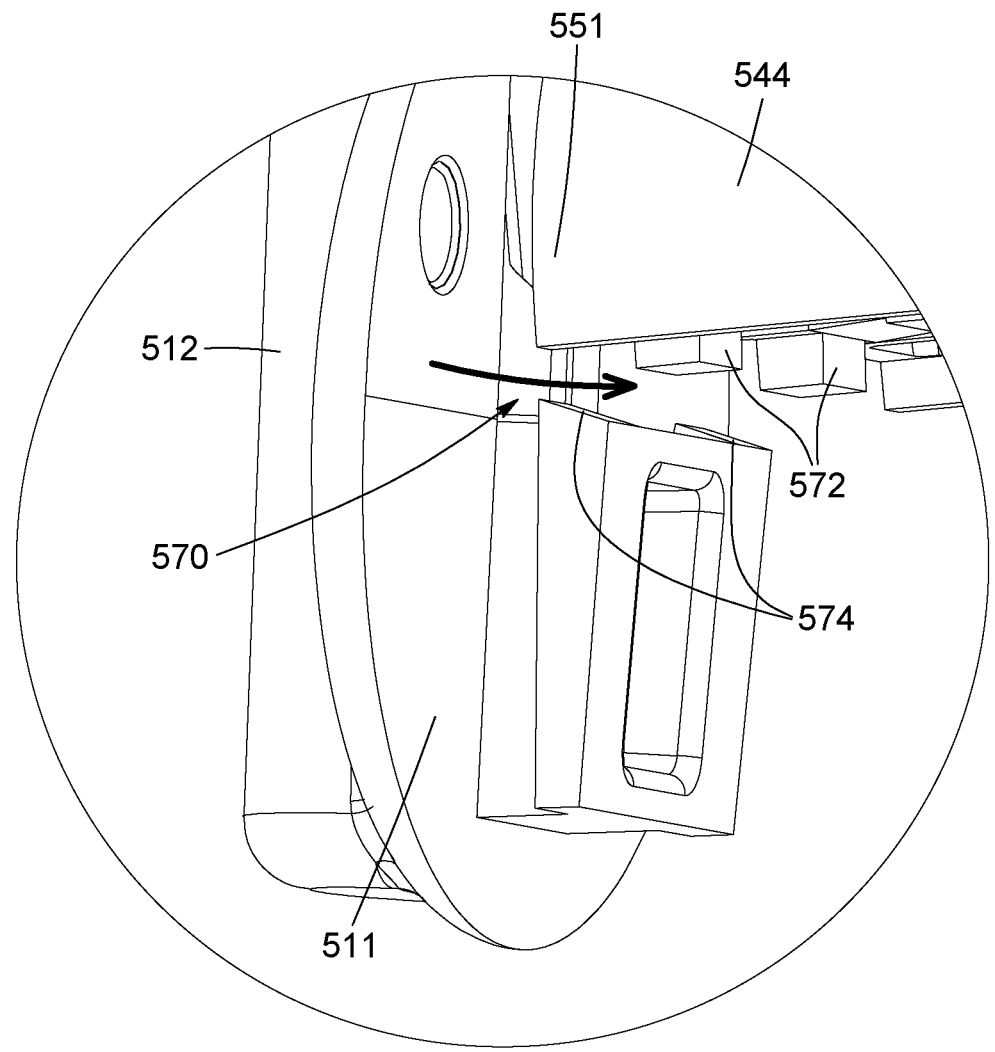
FIG. 16A is an enlarged view of the cooperation between a second handrail-mounting member of the second handrail-mounting subassembly and a first connecting member of the first handrail-mounting subassembly.

In the embodiment shown, the hood-mounting portion 511 of the first handrail-mounting member 512 is also removably securable (for instance removably mountable) to a proximal end portion 551 of the second connecting member 544 when the bracket assembly 500 is configured in the mounting configuration. For instance, an assembler-receiving cavity 570 is formed in the hood-mounting portion 511 of the first handrail-mounting member 512 which is shaped and dimensioned to receive at least partially at least one bracket-assembling locker 572 of the second handrail-mounting subassembly 540. For instance, the second handrail-mounting subassembly 540 comprises two bracket-assembling lockers 572 protruding downwardly at the proximal end portion 551 of the second connecting member 544 thereof. As best shown in FIG. 16A, the hood-mounting portion 511 (or distal end portion 511) of the first handrail-mounting member 512 comprises one or more locker-guiding slopes 574 shaped and dimensioned to guide the bracket-assembling lockers 572 towards the assembler-receiving cavity 570 upon displacing (for instance pivoting) the first and second bracket bodies 516, 546 towards each other, once the first and second handrail-engaging heads 523, 553 are at least partially inserted into the bracket-engaging opening 30.

It is appreciated that the shape, the configuration, the number and/or the location of the assembler-receiving cavity, the bracket-assembling lockers and/or the locker-guiding slopes can vary from the embodiment shown.

In the embodiment shown, as represented for instance in FIG. 19, the hood-mounting portion 511 of the first handrail-mounting member 512 is shaped and dimensioned to cover at least partially the proximal end portions 521, 551 of the first and second connecting members 514, 544. For instance, the hood-mounting portion 511 is substantially disk-shaped. In the embodiment shown, wherein the second handrail-mounting subassembly 540 is integrally formed as a single component, the hood-mounting portion 541 of the second handrail-mounting member 542 is sandwiched between the hood-mounting portion 511 of the first handrail-mounting member 512 and the second connecting member 544 when the handrail-mounting bracket assembly 500 is configured in the mounting configuration.

Figure 17:
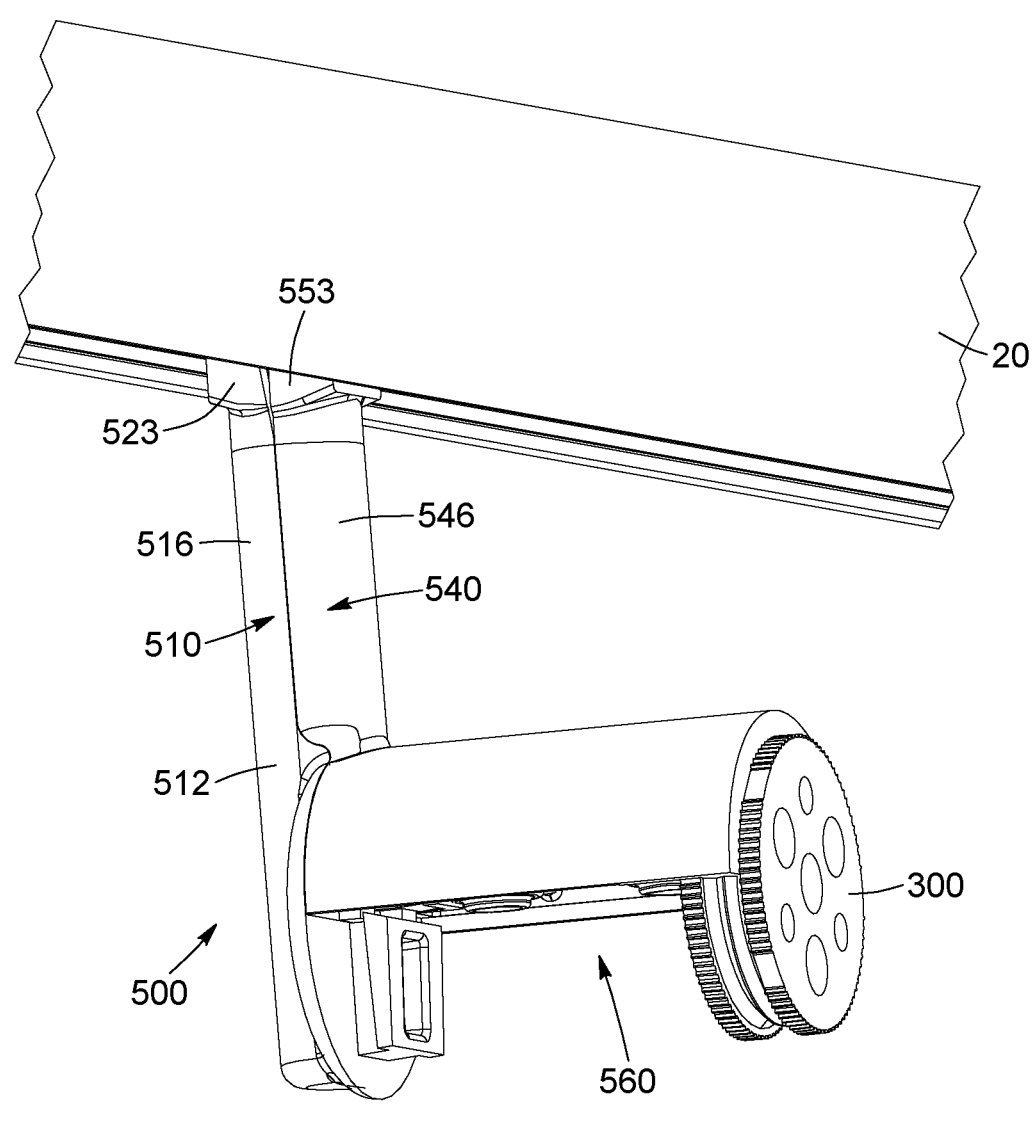
FIG. 17 is a side perspective view of the handrail-mounting bracket assembly of FIG. 14 is a partially mounting configuration.

As best shown in FIG. 17, the bracket assembly 500 is configurable into a partially mounting configuration wherein the first handrail-mounting member 512 is secured to (for instance mounted to) the second handrail-mounting subassembly 540 (for instance via the above-described the bracket-assembling lockers engaged in the assembler-receiving cavity), upon pivoting of the bracket bodies 516, 546 toward each other, after engaging at least partially the head-engaging heads 523, 553 into the bracket-engaging opening.

To further configure the handrail-mounting bracket assembly 500 into the mounting configuration, the first connecting member 514 is secured to (for instance mounted to) at least one of the first handrail-mounting member 512 and the second handrail-mounting subassembly 540. For instance, the first connecting member 514 is substantially vertically translated towards the second connecting member 544 to at least partially enclose the disk-shaped handrail element connector 300 in the connector-receiving cavity 560 at least partially delimited by the connector-receiving sleeve 559 formed by the first and second connecting members 514, 544. For instance, the disk-shaped handrail element connector 300 is at least partially surrounded by connecting end portions or distal end portions of the first and second connecting members 514, 544.

As best shown in FIGS. 18 and 19, the first and second connecting members 514, 544 both comprise a substantially half-cylindrical hood body 515, 545 extending between the proximal and distal end portions of the first and second connecting members 514, 544. Similarly to the above-described embodiments, the first and second handrail-mounting subassemblies 510, 540 of the bracket assembly 500 are configured such that when the bracket assembly 500 is configured in the mounting configuration, the first and second connecting members 514, 544 form a connecting portion securable to the second handrail element or the support structure.

As best shown in FIG. 19, when in the mounting configuration, the first and second handrail-mounting members 512, 542 and the first and second connecting members 514, 544 of the bracket assembly 500 define respectively a handrail-mounting axis X4 and a connector axis X5, the handrail-mounting axis and the connector axis being transversal to each other (for instance substantially perpendicular to each other). In other words, the bracket assembly is substantially L-shaped, even though any other shape could be conceived.

In the embodiment shown, the handrail-mounting bracket assembly 500 is also shaped and dimensioned to cooperate with a disk-shaped handrail element connector 300 but it could also be conceived an L-shaped handrail-mounting bracket assembly that would shaped and dimensioned to form a section of a handrail assembly (i.e. to connect a handrail element with another component of the handrail assembly) without a disk-shaped handrail element connector 300 being clamped between the first and second handrail-mounting subassemblies 510, 540 or that would be shaped and dimensioned to cooperate with a handrail element connector having any other shape.

It is appreciated that the shape, the configuration, and the location of the bracket assembly, the first and second handrail-mounting subassemblies and the first and second handrail-mounting members and connecting members thereof can vary from the embodiments shown.

For instance, the present disclosure is not limited to handrail-mounting bracket assemblies having either a substantially L-shape or a substantially T-shape. It could also be conceived handrail-mounting bracket assemblies having any other shape, such as, for instance, a substantially curved shape.

Method for Removably Mounting a Multi-Pieced Handrail-Mounting Bracket to a Handrail Element According to another aspect of the disclosure, there is provided a method 600 for removably mounting a multi-pieced handrail-mounting bracket to a handrail element having a bracket-engaging opening.

The method according to embodiments of the present disclosure may be carried out with a multi-pieced handrail-mounting bracket or handrail-mounting bracket assembly 100, 200, 400, 500 such as those described above. For instance, the multi-pieced handrail-mounting bracket comprises first and second handrail-mounting subassemblies having respectively first and second handrail-mounting members and first and second connecting members.

In the embodiment shown, the method 600 comprises a step 610 of engaging handrail-mounting portions of the first and second handrail-mounting members into the bracket-engaging opening. To this end, in the embodiments shown, the method comprises pivoting toward each other handrail-engaging heads of the first and second handrail-mounting members so that a handrail-mounting end portion of the bracket assembly has a first cross-section smaller than an opening dimension of the bracket-engaging opening.

The method 600 further comprises a step 620 of spacing apart from each other the first and second handrail-mounting portions (for instance the handrail-engaging heads of the first and second handrail-mounting members) so that the handrail-mounting end portion of the bracket assembly has a second cross-section greater than the opening dimension of the bracket-engaging opening.

The method 600 further comprises a step 630 of connecting to each other the first and second connecting members of the first and second handrail-mounting subassemblies.

The method might further comprise a step of clamping a handrail element connector between the first and second connecting members of the first and second handrail-mounting subassemblies.

The method might also comprise a step of engaging one or more mechanical fasteners in corresponding one or more fastener-receiving apertures formed in the first and second handrail-mounting subassemblies (for instance in the first and second connecting members thereof).

In the embodiments of the bracket assembly wherein each of the first and second handrail-mounting subassemblies is substantially single-pieced (i.e. wherein the first and second handrail-mounting subassemblies are respectively formed as two single components), the method might further comprise a step of pivoting toward each other the first and second handrail-mounting members of the first and second handrail-mounting subassemblies of the multi-pieced handrail-mounting bracket to connect to each other the first and second connecting members.

It is thus understood that once the handrail-engaging heads are at least partially inserted in the bracket-engaging opening, the first and second handrail-mounting subassemblies are pivoted toward each other (i.e. the first and second handrail-mounting members, on the one hand, and the first and second connecting members, on the other hand, are pivoted toward each other, so as to abut the abutment surfaces of the handrail-mounting members against each other) so as to prevent removal of the first and second handrail-mounting members from the bracket-engaging opening while clamping the handrail element connector between the first and second connecting members of the first and second handrail-mounting subassemblies.

In the embodiment of the bracket assembly wherein the first handrail-mounting member and the first connecting member of the first handrail-mounting subassembly are formed of distinct elements securable (for instance in a removable manner) together, the method might further comprise a step of connecting to each other the second connecting member and the first handrail-mounting member. The connecting of the second connecting member and the first handrail-mounting member ensures that the handrail-mounting portions of the first and second handrail-mounting members are maintained into the bracket-engaging opening, so as prevent removal of the second connecting member and the first handrail-mounting member from the bracket-engaging opening once inserted therein.

The method might further comprise a step of connecting to each other the first connecting member and the first handrail-mounting member of the first handrail-mounting subassembly, so as to prevent disconnecting of the first connecting member and the second handrail-mounting member and to clamp the handrail element connector between the first and second connecting members of the first and second handrail-mounting subassemblies.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited by the scope of the appended claims.

For instance, while the present description refers to handrail-mounting bracket assemblies for connecting two handrail elements or handrail components or a handrail element to a support structure, the person skilled in the art will understand that the handrail-mounting bracket assemblies may be adapted for connecting tubes or tubular structures other than handrail elements. The tubular structures to be connected together may be hollow or partially hollow. For example, only one portion of a tubular structure may be hollow in order to allow the handrail-mounting bracket assembly to be inserted into the hollow portion of the tubular structure for attachment purposes while the remaining of the tubular structure is solid. For example, the handrail-mounting bracket assembly may be adapted to connect together two angled safety railings or railing sections, two angled grab bars or grab bar sections, two angled footrests or footrest sections, two angled curtain rods or rod sections, or any of these elements to a support structure such as a wall.

The invention claimed is:

1. A handrail-mounting bracket assembly for mounting a first handrail element to a second handrail element or a support structure, the bracket assembly comprising:

a first handrail-mounting subassembly including a first handrail-mounting member and a first connecting member;

a second handrail-mounting subassembly including a second handrail-mounting member and a second connecting member;

the bracket assembly being selectively configurable in an engagement configuration in which the first and second handrail-mounting members are at least partially insertable into a bracket-engaging opening of the first handrail element, and in a mounting configuration wherein the first and second handrail-mounting members at least partially form together a handrail-mounting end portion of the bracket assembly and are locked with the first handrail element so as to prevent removal of the bracket assembly from the bracket-engaging opening once inserted there in;

wherein each of the first and second connecting members comprises a half-cylindrical body so that the first and second connecting members form together a cylindrical connector-receiving sleeve centered about an axis defining a connector-receiving cavity when the bracket assembly is configured in the mounting configuration, first and second portions of a peripheral wall of the connector-receiving sleeve being formed respectively by radially aligned inner surfaces of the first and second connecting members; and wherein the first handrail-mounting member comprises at least one guiding member and the second handrail-mounting member comprises at least one guiding recess shaped and dimensioned to at least partially receive said at least one guiding member when the bracket assembly is configured in the mounting configuration, wherein said at least one guiding recess faces towards the first handrail-mounting member and said at least one guiding member is formed integral with the second handrail-mounting member and extends towards the first handrail-mounting member to be received in said at least one guiding recess when the bracket assembly is configured from the engagement configuration towards the mounting configuration, wherein said at least one guiding member and said at least one guiding recess are contained within an inner volume delimited by the first and second handrail-mounting members when in the mounting configuration, wherein each of the first and second handrail-mounting members has a handrail-mounting portion, an opposed hood-mounting portion and a bracket body therebetween, the handrail-mounting portions forming together the handrail-mounting end portion of the bracket assembly when configured in the mounting configuration, wherein at least one of the first and second handrail-mounting members comprises a handrail-engaging head forming at least partially the handrail-mounting portion thereof, the handrail-engaging head having a cross-section greater than a cross-section of the corresponding bracket body.

2. The handrail-mounting bracket assembly according to claim 1, wherein at least one of the first and second handrail-mounting members comprises a substantially curved outer profile at a junction of the handrail-engaging head and the corresponding bracket body and wherein a handrail-mounting recess is formed at a junction of the handrail-engaging head and the corresponding bracket body and wherein the first and second handrail-mounting members comprise each an abutment surface facing each other and at least partially abutting each other in the mounting configuration and wherein one of the first and second handrail-mounting members comprises an inclined surface at the handrail-engaging head thereof substantially facing the other one of the first and second handrail-mounting members and adjacent the abutment surface of said one of the first and second handrail-mounting members, the inclined surface being angled relative to the abutment surface to thereby define a fulcrum.

3. The handrail-mounting bracket assembly according to claim 1, each of the first and second handrail-mounting members has a handrail-mounting portion, an opposed hood-mounting portion and a bracket body therebetween, the handrail-mounting portions forming together the handrail-mounting end portion of the bracket assembly when configured in the mounting configuration, wherein the bracket bodies of the first and second handrail-mounting members comprise respectively the at least one guiding member and the at least one guiding recess.

4. The handrail-mounting bracket assembly according to claim 3, wherein the bracket bodies of the first and second handrail-mounting members have a substantially semi-cylindrical shape, wherein said at least one guiding member and said at least one guiding recess are contained within a cylinder formed by the bracket bodies of the first and second handrail-mounting members when in the mounting configuration.

5. The handrail-mounting bracket assembly according to claim 1, wherein at least one of the first and second handrail-mounting subassemblies is formed of distinct elements securable together, said distinct elements are removably securable together, wherein the hood-mounting portion of the first handrail-mounting member is removably securable to at least one of the first connecting member at a proximal end portion thereof and the second connecting member at a proximal end portion thereof.

6. The handrail-mounting bracket assembly according to claim 5, wherein the hood-mounting portion of the first handrail-mounting member is shaped and dimensioned to cover at least partially the proximal end portions of the first and second connecting members and wherein the hood-mounting portion of the first handrail-mounting member is substantially disk-shaped.

7. The handrail-mounting bracket assembly according to claim 1, wherein said at least one guiding member comprises two substantially parallel guiding plates shaped and dimensioned to be at least partially received in two substantially parallel corresponding guiding recesses of the second handrail-mounting member.

8. A multi-pieced handrail-mounting bracket for mounting a first handrail element to a second handrail element or a support structure, the multi-pieced handrail-mounting bracket having a handrail-mounting end portion and comprising first and second handrail-mounting subassemblies comprising respectively:

first and second handrail-mounting members at least partially removably engageable in a bracket-engaging opening formed in the first handrail element and forming at least partially the handrail-mounting end portion; and first and second connecting members, wherein each of the first and second connecting members comprises a half-cylindrical body;

wherein the multi-pieced handrail-mounting bracket is configurable into an engagement configuration in which the handrail-mounting end portion has a first cross-section smaller than an opening dimension of the bracket-engaging opening, and into a mounting configuration wherein the first and second handrail-mounting members are connected to each other and the handrail-mounting end portion has a second cross-section greater than the opening dimension of the bracket-engaging opening, the first and second connecting members forming together a cylindrical connector receiving sleeve defining a connector-receiving cavity, first and second portions of a peripheral wall of the connector-receiving sleeve being formed respectively by inner surfaces of the first and second connecting members; and wherein the first handrail-mounting member comprises at least one guiding member and the second handrail-mounting member comprises at least one guiding recess shaped and dimensioned to at least partially receive said at least one guiding member when the multi-pieced handrail-mounting bracket is configured in the mounting configuration, wherein said at least one guiding recess faces towards said first handrail-mounting member and said at least one guiding member is formed integral with said first and second handrail-mounting member and extends towards said second handrail-mounting member to be received in said at least one guiding recess when the multi-pieced handrail-mounting bracket is configured from the engagement configuration towards the mounting configuration, wherein said at least one guiding member and said at least one guiding recess are contained with an inner volume delimited by the first and second handrail-mounting members when in the mounting configuration, wherein each of the first and second handrail-mounting members has a handrail-mounting portion, an opposed hood-mounting portion and a bracket body therebetween, the handrail-mounting portions forming together the handrail-mounting end portion of the multi-pieced bracket when configured in the mounting configuration, and wherein at least one of the first and second handrail-mounting members comprises a handrail-engaging head forming at least partially the handrail-mounting portion thereof, the handrail-engaging head having a cross-section greater than across-section of the corresponding bracket body.

9. The multi-pieced handrail-mounting bracket according to claim 8, wherein the handrail-engaging head comprises a locking end portion, an outer cross-section of the handrail-engaging head increasing towards the locking end portion.

10. The multi-pieced handrail-mounting bracket according to claim 8, wherein the first and second handrail-mounting members comprise each an abutment surface facing each other and at least partially abutting each other in the mounting configuration and wherein one of the first and second handrail-mounting members comprises an inclined surface at the handrail-engaging head thereof substantially facing the other one of the first and second handrail-mounting members and adjacent the abutment surface of said one of the first and second handrail-mounting members, the inclined surface being angled relative to the abutment surface to thereby define a fulcrum.

11. The multi-pieced handrail-mounting bracket according to claim 8, wherein one or more fastener-receiving apertures is formed in at least one of the first and second handrail-mounting subassemblies, and wherein said one or more fastener-receiving apertures is formed in at least one of the first and second connecting members.

12. The handrail-mounting bracket assembly according to claim 8, wherein each of the first and second handrail-mounting members has a handrail-mounting portion, an opposed hood-mounting portion and a bracket body therebetween, the handrail-mounting portions forming together the handrail-mounting end portion of the multi-pieced handrail-mounting bracket when configured in the mounting configuration, wherein the bracket bodies of the first and second handrail-mounting members comprise respectively the at least one guiding member and the at least one guiding recess, wherein the bracket bodies of the first and second handrail-mounting members have a substantially semi-cylindrical shape, wherein said at least one guiding member and said at least one guiding recess are contained within a cylinder formed by the bracket bodies of the first and second handrail-mounting members when in the mounting configuration.

13. The handrail-mounting bracket assembly according to claim 8, wherein said at least one guiding member comprises two substantially parallel guiding plates shaped and dimensioned to be at least partially received in two substantially parallel corresponding guiding recesses of the second handrail-mounting member.

14. A method for removably mounting a multi-pieced handrail-mounting bracket to a handrail element having a bracket-engaging opening, the multi-pieced handrail-mounting bracket comprising first and second handrail-mounting subassemblies having respectively first and second handrail-mounting members and first and second connecting members each comprising a half-cylindrical body, the method comprising:

engaging handrail-mounting portions of the first and second handrail-mounting members into the bracket-engaging opening, each of the first and second handrail-mounting members further including a hood-mounting portion opposing the corresponding handrail-mounting portion and a bracket body therebetween, the handrail-mounting portions forming together a handrail-mounting end portion of a bracket assembly when configured in the mounting configuration, at least one the first and second handrail-mounting members comprising a handrail-engaging head forming at least partially the handrail-mounting portion thereof, the handrail-engaging head having a cross-section greater than a cross-section of the corresponding bracket body;

spacing apart from each other the handrail-mounting portions;

inserting at least one guiding member formed integral with the first handrail-mounting member within at least one guiding recess of the second handrail-mounting member, wherein said at least one guiding member and said at least one guiding recess are contained within an inner volume delimited by the first and second handrail-mounting members; and connecting to each other the first and second connecting members of the first and second handrail-mounting subassemblies, so as to form a cylindrical receiving sleeve centered about an axis defining a connector-receiving cavity wherein first and second portions of a peripheral wall of the connector-receiving sleeve are formed respectively by radially aligned inner surfaces of the first and second connecting members.

15. The method according to claim 14, wherein the first and second handrail-mounting subassemblies are respectively formed as single components, the method further comprising pivoting toward each other the first and second handrail-mounting members of the first and second handrail-mounting subassemblies to connect to each other the first and second connecting members.

16. The method according to claim 14, wherein the first handrail-mounting member and the first connecting member are distinct elements, the method further comprising connecting to each other the second connecting member and the first handrail-mounting member and connecting to each other the first connecting member and the first handrail-mounting member of the first handrail-mounting subassembly.

17. The method according to claim 14, further comprising clamping a handrail element connector between the first and second connecting members, the handrail element connector being engaged in the connector-receiving cavity.

18. The method according to claim 14, further comprising engaging one or more mechanical fasteners in corresponding one or more fastener-receiving apertures formed in the first and second handrail-mounting subassemblies.

* * * * *